(12) United States Patent
Boucké et al.

(10) Patent No.: US 12,326,002 B2
(45) Date of Patent: Jun. 10, 2025

(54) DECORATIVE PANEL, AND DECORATIVE FLOOR COVERING CONSISTING OF SAID PANELS

(71) Applicant: I4F Licensing NV, Turnhout (BE)

(72) Inventors: Eddy Alberic Boucké, Menen (BE); Mathias Wilhelmus De Koning, Laren (NL)

(73) Assignee: I4F Licensing NV, Turnhout (BE)

( * ) Notice: Subject to any disclaimer, the term of this patent is extended or adjusted under 35 U.S.C. 154(b) by 222 days.

(21) Appl. No.: 18/007,522

(22) PCT Filed: Jun. 4, 2021

(86) PCT No.: PCT/EP2021/065054
§ 371 (c)(1),
(2) Date: Dec. 1, 2022

(87) PCT Pub. No.: WO2021/245261
PCT Pub. Date: Dec. 9, 2021

(65) Prior Publication Data
US 2023/0220679 A1   Jul. 13, 2023

(30) Foreign Application Priority Data

Jun. 4, 2020  (NL) .................................... 2025762
Nov. 13, 2020 (NL) .................................... 2026896

(51) Int. Cl.
*E04F 15/02*   (2006.01)
*B32B 3/06*    (2006.01)
(Continued)

(52) U.S. Cl.
CPC .......... *E04F 15/02038* (2013.01); *B32B 3/06* (2013.01); *B32B 27/20* (2013.01); *B32B 27/22* (2013.01); *B32B 27/304* (2013.01); *C08J 9/0061* (2013.01); *C08J 9/33* (2013.01); *C08L 27/06* (2013.01); *E04F 13/0894* (2013.01); *E04F 13/18* (2013.01); *E04F 15/105* (2013.01); *B32B 27/40* (2013.01); *B32B 2262/0261* (2013.01); *B32B 2262/062* (2013.01); *B32B 2262/101* (2013.01); *B32B 2264/065* (2013.01);
(Continued)

(58) Field of Classification Search
CPC ........ E04F 15/02038; E04F 2201/0161; B32B 3/06
See application file for complete search history.

(56) References Cited

U.S. PATENT DOCUMENTS 5,380,794 A    1/1995 Schaefer et al.
9,409,382 B2 * 8/2016 Hakansson ............. B32B 37/14
(Continued)

FOREIGN PATENT DOCUMENTS

CN   110724477 A    1/2020
EP    3540009 A1 *  9/2019 .............. C08L 27/06
(Continued)

*Primary Examiner* — Joshua K Ihezie
(74) *Attorney, Agent, or Firm* — The Webb Law Firm

(57) ABSTRACT

The invention relates to a panel, in particular a decorative panel, a floor panel, a ceiling panel or a wall panel. The invention also relates to a covering consisting of a plurality of mutually coupled panels according to the invention, in particular a floor covering consisting of a plurality of mutually coupled panels, according to the invention.

21 Claims, 16 Drawing Sheets

(51) Int. Cl.
  *B32B 27/20* (2006.01)
  *B32B 27/22* (2006.01)
  *B32B 27/30* (2006.01)
  *C08J 9/00* (2006.01)
  *C08J 9/33* (2006.01)
  *C08L 27/06* (2006.01)
  *E04F 13/08* (2006.01)
  *E04F 13/18* (2006.01)
  *E04F 15/10* (2006.01)
  *B32B 27/40* (2006.01)

(52) U.S. Cl.
  CPC ..... *B32B 2264/067* (2013.01); *B32B 2272/00* (2013.01); *B32B 2307/412* (2013.01); *B32B 2307/554* (2013.01); *B32B 2607/00* (2013.01); *C08J 2327/06* (2013.01); *C08J 2429/14* (2013.01); *C08J 2475/04* (2013.01); *C08L 2201/02* (2013.01); *C08L 2203/14* (2013.01); *C08L 2205/06* (2013.01); *C08L 2207/20* (2013.01); *E04F 2201/0161* (2013.01); *E04F 2201/023* (2013.01); *E04F 2201/042* (2013.01); *E04F 2201/043* (2013.01)

(56) References Cited

U.S. PATENT DOCUMENTS

| | | | |
|---|---|---|---|
| 10,072,428 B2* | 9/2018 | Devos | B32B 27/36 |
| 10,844,610 B2 | 11/2020 | Boucke | |
| 11,453,769 B2 | 9/2022 | Holmegaard et al. | |
| 2008/0119604 A1 | 5/2008 | Greenawalt | |
| 2014/0144583 A1* | 5/2014 | Hakansson | B41M 5/0017 |
| | | | 156/277 |
| 2017/0328072 A1* | 11/2017 | Hannig | E04F 15/04 |
| 2018/0030737 A1* | 2/2018 | Pervan | E04F 15/102 |
| 2018/0298620 A1* | 10/2018 | Pailler | B32B 5/022 |
| 2019/0017278 A1* | 1/2019 | De Rick | E04F 15/105 |
| 2022/0056703 A1* | 2/2022 | Boucké | C08L 29/14 |
| 2022/0243483 A1* | 8/2022 | Clement | B32B 21/06 |

FOREIGN PATENT DOCUMENTS

| | | |
|---|---|---|
| WO | 2017064260 A1 | 4/2017 |
| WO | 2020083614 A1 | 4/2020 |

\* cited by examiner

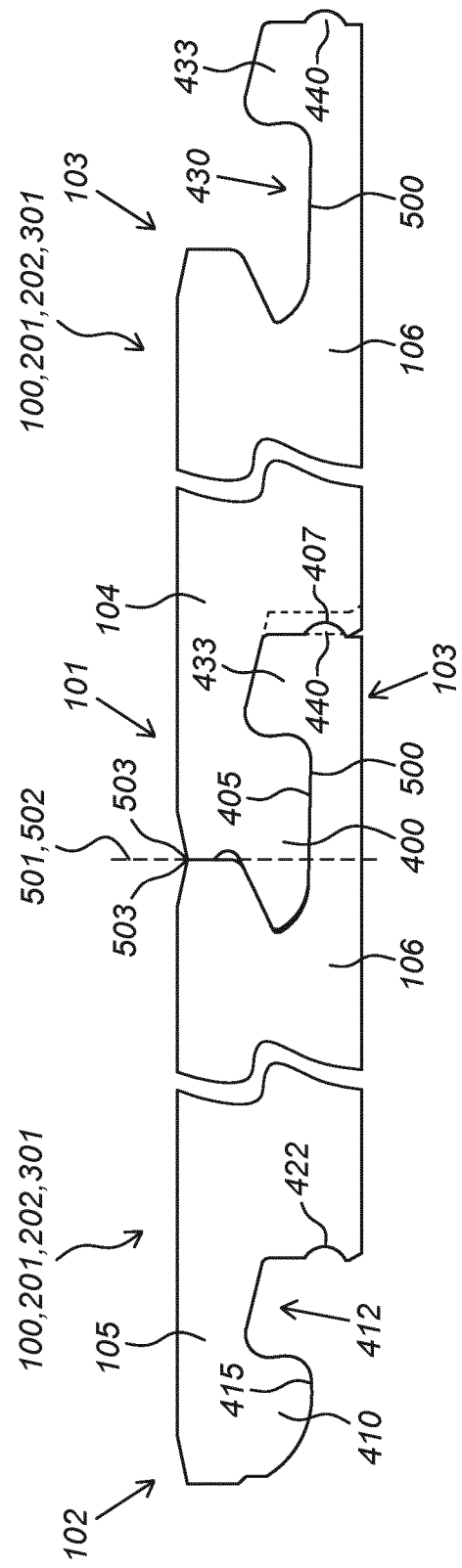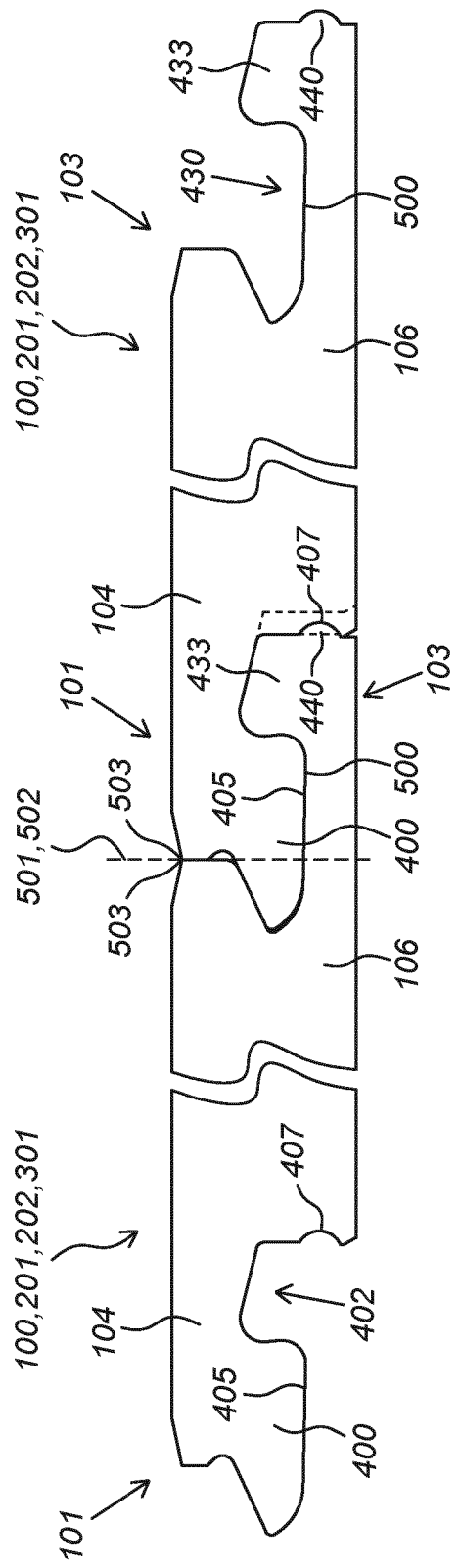

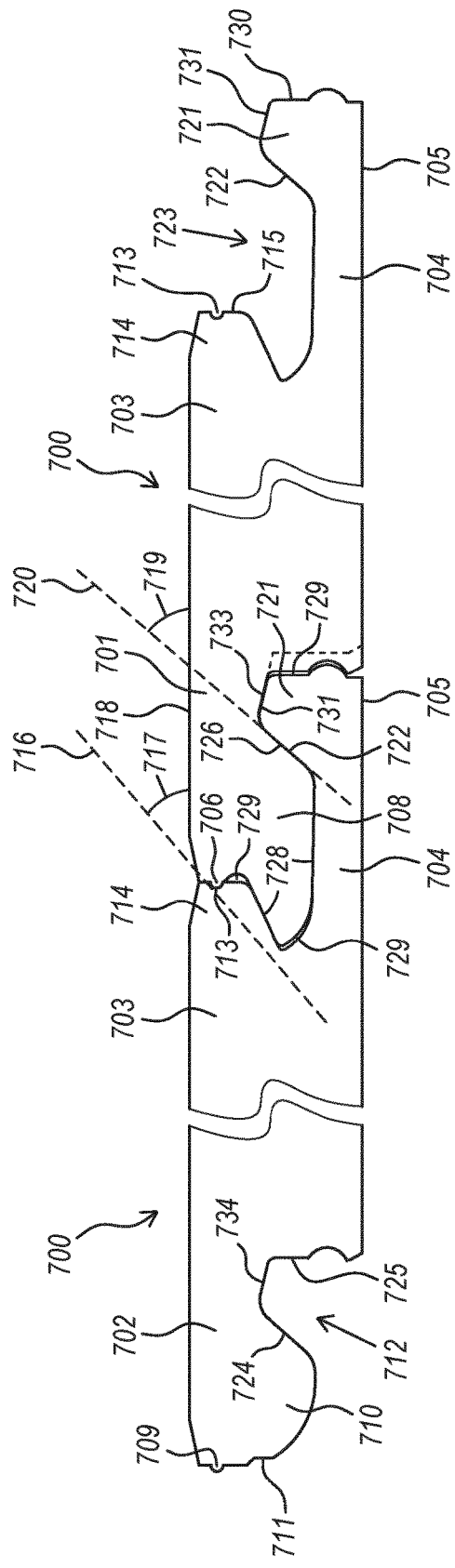
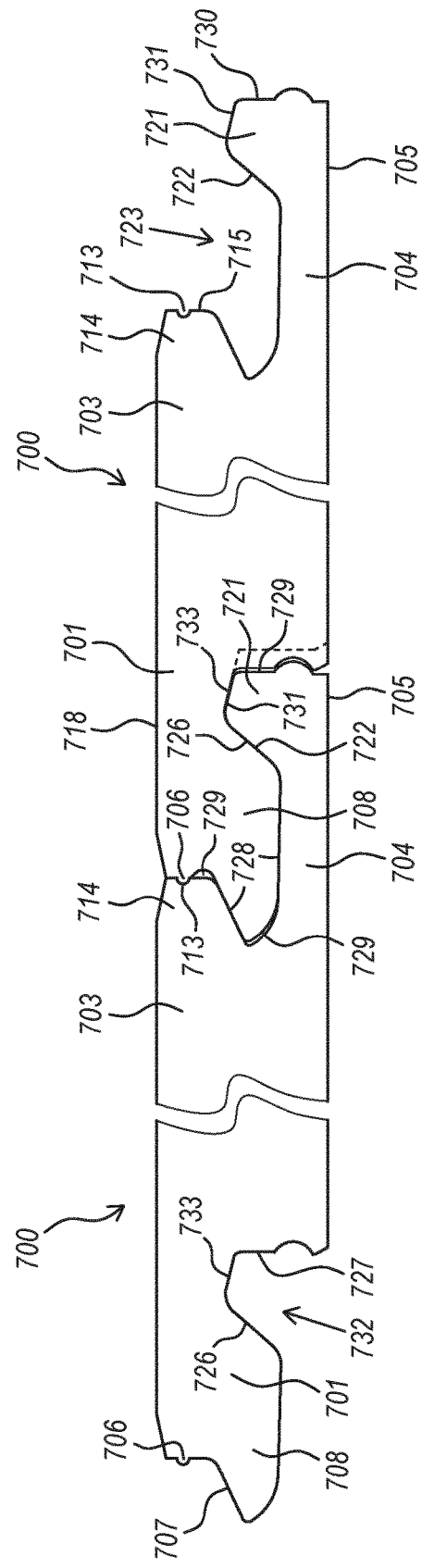
Fig. 7a
Fig. 7b

DECORATIVE PANEL, AND DECORATIVE FLOOR COVERING CONSISTING OF SAID PANELS

CROSS-REFERENCE TO RELATED APPLICATIONS

This application is the United States national phase of International Application No. PCT/EP2021/065054 filed Jun. 4, 2021, and claims priority to The Netherlands Patent Application Nos. 2025762 filed Jun. 4, 2020 and U.S. Pat. No. 2,026,896 filed Nov. 13, 2020, the disclosures of which are hereby incorporated by reference in their entireties.

BACKGROUND OF THE INVENTION

Field of the Invention

The invention relates to a panel, in particular a decorative panel, a floor panel, a ceiling panel or a wall panel. The invention also relates to a covering consisting of a plurality of mutually coupled panels according to the invention, in particular a floor covering consisting of a plurality of mutually coupled panels, according to the invention.

Description of Related Art

Phthalate esters are widely used as plasticisers for polyvinyl chloride. The alcohols from which the plasticiser esters are made are generally obtained by either olefin oligomerisation followed by hydroformylation or by hydroformylation of olefins to form aldehydes followed by aldehyde dimerization, generally by an aldol reaction. The alkyl groups of the esters therefore vary in size and structure according to the process and raw materials used to produce the alcohols. The size and structure of the alkyl group helps determine the volatility and gelation temperature of the plasticizer and is therefore chosen according to the application in which the plasticized polyvinyl chloride is to be used. There is a constant need to improve the properties of plasticisers to provide polyvinyl chloride compositions having improved properties. There is also a need for alternative plasticisers. In addition there is a need to improve the properties of plasticizers.

In particular, there is a need to minimizing the leaching out of plasticizers from the matrix of the main polymer in which they are incorporated, by incorporating a plasticizer that has no tendency to migrate through the polymer matrix. In that context, it is furthermore advantageous when the plasticizer has an environmentally friendly profile and is non-toxic.

It is an objective of the invention to meet at least one of the needs mentioned above.

SUMMARY OF THE INVENTION

The above objective of the invention, is met by the provision of a panel according to the preamble, comprising:
- a core provided with an upper side and a lower side,
- as an optional feature, a decorative top structure affixed on said upper side of the core,
- a first panel edge comprising a first coupling profile, and a second panel edge comprising a second coupling profile being designed to engage interlockingly with said first coupling profile of an adjacent panel, preferably both in horizontal direction and in vertical direction,
- wherein said panel, in particular said core, comprises a material layer which comprises:
  - at least one main polymer, and
  - at least one plasticizer composition which comprises polyvinyl butyral (PVB), preferably in a content of 35-65% % by weight of the plasticizer composition.

The claimed plasticizer composition has the benefit over classical plasticizers used in floor panels, that the composition is relatively safe to use and is less toxic. Thus a plasticizer composition is proposed which is well suitable to be incorporated in the decorative panel, in particular in the core (and/or another layer) of the decorative panel. At the same time, the panel is intrinsically elastically deformable due to the inclusion of the plasticizer composition in the material layer.

Furthermore, it has been found that in the claimed panel the components that are included in the plasticizer composition do not have the tendency to migrate through the main polymer matrix. A detrimental leaching out of plasticizer components from the matrix is thus avoided by incorporating a plasticizer composition as claimed. Moreover, the plasticizer composition used in the panel according to the invention is a polymer based plasticizer composition, preferably free of phthalates, and therefore differs over classical plasticizers. Hence, the polymer based plasticizer composition used in the panel according to the invention can also be considered as a flexibilizer composition, or more briefly as a flexibilizer. The presence of this plasticizer composition (or flexibilizer) provides the material layer(s) of the panel, and therefore the panel as such a desired flexibility (resiliency), which makes the panel less breakable, and therefore less vulnerable. Moreover, this also facilitates a proper installation of the panel onto e.g. a (slightly) uneven floor, and additionally improves the acoustic properties (both the sound transmission and the sound reflection) of the panel as such. The panels according to invention can even be provided sufficient flexibility to wind up the panel(s), which may facilitate storage and/or transport of the panel(s) prior to installation. It is thus imaginable that the panel is formed by a strip (or sheet) provided as a roll to be laid out by unrolling from said roll. The length of such a strip is typically between 4 and 30 meter. The panel may for instance be elongated, and have a width between 10 and 100 cm, and a length of 50 to 250 cm. The panel is typically a polygonal, in particular rectangular, panel, although other shapes, such as hexagonal or octagonal shapes, may also be applied.

The polymer blend compound used in at least one material layer of the core is primarily intended as a totally non-migrating plasticizer for flexible polymer based panels and/or for impact modification of other polymers, wherein both the elastic and the acoustical (sound-dampening) properties are improved.

If PVB is used as sole plasticizer additive in for example a PVC based core, there is typically a poor compatibility between PVB and PVC leading to limited plasticizing effect and brittleness of the blend. Here, a less successful microstructure (with microvolumes of PVB embedded in a PVC based matrix) may also result unwanted drawbacks such as reduced tear strength, risk of partial deterioration over time and risk of uneven freeze-fracture. According to the present invention by including PVB in a solid state non-migrating plasticizer, by blending (mixing) PVB with one or more alloyed copolymers, the above mentioned drawbacks of using PVB as plasticizer, especially in PVC, are avoided. Further, PVB can be maximized and the properties of the final polymer matrix enhanced. Here an improved elongation at break, the change of flexural and tensile modulus, the improved strength and the maintained surface tension are typically considered as most important improved properties. This allows new design possibilities for designing the panel, in particular since this type of polymer based plasticizer composition is scalable, and the microstructure of the blend reproducible and homogeneous.

Further, the plasticizer composition used in the material layer of the panel according to the present invention typically modifies recycled PVC or recycled PU as well, giving possibility to scale and tune properties of rPVC (recycled or reclaimed PVC) or rPU (recycled or reclaimed PVC) for extended and meaningful reuse. It is in practice possible to extract unwanted plasticizers from the PVC by liquid or supercritical CO2 extraction, hereby giving possibility of recovering PVC without the problematic previously used phthalate plasticizers. Thus, with the present invention it is also possible to reuse rPVC and/or rPU by combining the rPVC and/or rPU with a controlled macromolecular (polymer based) plasticizer composition applied in at least one material layer of a panel according to the present invention, in particular by using the plasticizer composition of PVB together with at least one alloying copolymer. It is conceivable, and even preferable that virgin PU and/or recycled PU may constitute the main polymer. Since (r)PU already has some natural flexibility, the amount of plasticizer composition added to said PU can be kept restricted. Here, for example, main polymer constitutes 91-98% by weight and the plasticizer composition constitutes 2-9% by weight of the polymer blend composition.

Preferably, the panel according to the invention comprises that the first and second coupling profiles are part, preferably integral part, of the material layer of the core comprising the blend of the main polymer and the plasticizer composition. As such, the coupling profiles are intrinsically elastically deformable, which is advantageous for a sound coupling of the two respective profiles both during the process of coupling as well as in the final state of two coupled profiles, since the preferred coupling profiles are typically designed such that a slight deformation of the respective profiles is required at least during the process of establishing an interlocking coupling. This deformed state may remain in the interlocked state of coupling profiles of adjacent panels, dependent on the design on the coupling profiles. Furthermore, in the final state of two coupled profiles which are of a deformable quality, and in particular where interlocked profiles are kept in a (slightly) deformed state, a (substantially waterproof) sealing effect said two coupling profiles may be achieved, which is advantageous in view of the panels being used as a covering layer that should be impervious to water, in particular from a viewpoint of cleanability of the panels.

Further preferred options of the panel according to the invention are set out in the dependent claims as appended, which amongst others, define the following additional features, which may or may not be combined with each other:
 the plasticizer composition comprises one or more admixed copolymers, other than and/or different from the at least one main polymer, preferably in a content of 65-35% % by weight of the plasticizer composition.
 the polyvinyl butyral component is recycled polyvinyl butyral, virgin polyvinyl butyral or a mixture thereof.
 the admixed copolymers are selected from the group consisting of:
  Ethylene vinyl alcohol Copolymer Resins;
  Ethylene copolymer based compatibilizers;
  A modified ethylene acrylate carbon monoxide terpolymer composition comprising ethylene vinyl acetates (EVAs), polyethylenes, metallocene polyethylenes, ionomers, ethylene propylene rubbers and polypropylenes; Functional polymers working as compatibilization promoter for polar polymers, ethylene vinyl acetate copolymer;
  mixtures thereof; and/or
  one or more derivatives of the above copolymers.
 the admixed copolymer is an Ethylene vinyl alcohol Copolymer Resin, optionally combined with one or more other admixed copolymer(s).
 the plasticizer composition comprises 40-60 wt. % PVB an 60-40 wt. % admixed copolymer(s) or preferably 45-55 wt. % PVB and 55-45 wt. % admixed copolymer(s) or more preferred 50 wt. % PVB and 50 wt. % admixed copolymer(s).
 the core comprises 25-90 wt. % main polymer and 10-75 wt. % plasticizer composition, preferably 30-50 wt. % plasticizer composition, and most preferably the core comprises 100 parts polyvinyl chloride as a main polymer and from 20 to 200 parts of a plasticizer composition.
 the main polymer is selected from the group consisting of: polyvinyl chloride (PVC), polypropylene (PP), polyurethane (PU), acryl butadiene styrene (ABS), polystyrene, preferably expanded polystyrene, or polyethylene (PE) and/or mixtures thereof.
 the main polymer and/or the plasticizer composition is a recycled material and/or is a biobased material.

In an alternative embodiment, the plasticizer composition comprises one or more copolymers which also represent(s) the main polymer, wherein the content of one of more copolymers in the plasticizer composition, which is the core composition in this case, is preferably 65-35% % by weight of the core composition.

Preferably, the plasticizer composition comprises recycled, more preferably post-consumed, PVB (rPVB). rPVB predominantly comes from waste laminated glass from automotive windshields or other laminated glass applications, e.g. from buildings and/or furniture. The PVB fraction is reclaimed and thoroughly cleaned, sorted and reprocessed according to the highest standards. Normally, pellets are formed of the (reclaimed) PVB where PVB is carefully compounded and extruded to form the pellets. Using rPVB in the panel according to the invention will contribute to a "green" or an environmentally friendly profile of the panel, in particular because problematic waste streams, that else would be thrown at landfills or incinerated are utilized to manufacture new panels. The environmental advantage, of the recovered PVB mined from the direct waste stream to incineration or landfill is thus evident. The "green" and environmentally friendly profile is improved even further if the main polymer, such as PVC or PU, is also recycled from a waste stream.

Preferably in the panel according to the invention, the main polymer and the components of the plasticizer composition form a homogeneously intermixed material, preferably having a microstructure that is similar to an alloy structure of metals.

The homogeneous quality of such a mixture further contributes to reducing the leaching out of plasticizers from the intermixed material.

In order to obtain a homogeneous intermixture of the main polymer and the components of the plasticizer, the mixing of all the constituting components is preferably performed at a raised temperature, more preferably a temperature at which the mixture as a whole is in a fully molten state.

It is well thinkable that the plasticizer composition further comprises one or more additional plasticizers chosen from the group consisting of:

An ortho-phthalate with an alkyl chain backbone having at least 7 carbon atoms, in particular DPHP (bis(2-propyl heptyl phthalate)), DIUP (disoundecylphtalate), or DTDP (disotridecyl phthalate); Di-isodecyl phthalate (DIDP), Di-isononyl phthalate (DINP);

A terephthalate, preferably (DOTP (Dioctyl terephthalate);

A cyclohexanoate, preferably DC9CH (cyclohexanoate diester);

A phthalate ester;

A citrate, preferably ATBC (acetyl tributyl citrate) tripentyl acetyl citrate (ATPC), trihexyl acetyl citrate (ATHC), triheptyl acetyl citrate (ATHC), trioctyl acetyl citrate (ATOC), trinonyl acetyl citrate (ATNC);

An adipates, preferably DOA (dioctyl adipates) or Bis(2-ethyl hexyl adipate),

A phosphate ester, preferably TPP (triphenyl phosphate);

An azelate, preferably DiDA (di iso decyl adipates) or dioctyl azelate or di-2-ethylhexyl azelate;

A trimellitate, preferably TOTM (Tris (2-Ethylhexyl) Trimellitate), tributyl trimellitate (TBTM), triisobutyl trimellitate (TiBTM), triethylhexyl trimellitate (TEHTM), triisononyl trimellitate (TINTM);

A dibenzoate, preferably ODEDB (oxydiethylene dibenzoate) or OXPDB (oxydipropyl benzoate);

1,2-benzenedicarboxylic acid).

It is also thinkable that the core and/or another layer of the panel comprises two types of additional plasticizers, in particular at least one additional plasticizer selected from the group consisting of: DOTP, DINP, and DIDP.

Preferably the core comprises 100 parts of polyvinyl chloride and from 20 to 200 parts of plasticizer composition. The plasticized layer, in particular the core, preferably comprises at least one compatibilizer to improve the compatibility between the at least one main polymer and the at least one plasticizer.

As indicated above, at least one material layer of the panel, and more preferably at least one material layer of the core, comprises a main polymer. This main polymer may be formed by a single polymer or may be formed by a mixture and/or blend and/or composite of a plurality of (main) polymers. This main polymer may be based on a renewable source (also referred to as 'bio-based plastic') and/or may be formed by a biodegradable polymer and/or a recycled polymer. Examples of suitable—typically non-biodegradable—bio-based plastics are bio-based polyethylene (bio-PE), bio-based polyethylene terephthalate (bio-PET), or polytrimethylene terephthalate (PTT). Examples of suitable—typically biodegradable—bio-based plastics are polylactic acid (PLA), polyhydroxyalkanoate (PHA), and starch. Preferably, the main polymer is a polyolefin and/or at least one thermoplastic, like e.g. polyethylene (PE), polypropylene (PP), polyvinylchloride (PVC), polyurethane (PUR, also referred to as PU), polystyrene (PS), polylactic acid (PLA), polyvinyl butyral (PVB), isotactic polypropylene, polybutylene, and/or a copolymer, preferably an ethylene-propylene copolymer. These polymer materials are typically relatively easy to melt and easy process, for example by means of extrusion.

It may be preferred that the core comprises an alloy of a main polymer matrix and elastic particles dispersed in said matrix, wherein the elastic particles are bonded to the polymer matrix by means of a covalent bond. The core material is therefore not a mechanically realized blend, but rather a chemically realized alloy of at least two compounds, in particular polymer matrix material and an elastic material, chemically bonded to each other. This chemical (covalent (atomic)) bonding is typically realized during the production process of the core composition. In this manner a block copolymer is formed, which is thermally stable, durable, and moreover, provides the core a desired flexibility (elasticity) and impact resistance. Moreover, the realized blend finds a balance between functional properties, which are typically predominantly determined by the elastic particles, and processing properties, which are typically predominantly determined by the matrix material. The matrix material is also referred to as the hard phase of the core, and the dispersed elastic particles are often referred to as the soft phase of the core.

The elastic particles have a greater elasticity than the matrix material. Typically, the elastic particles comprise at least one elastomer. An elastomer is a relatively flexible polymer. More, in particular an elastomer is typically a polymer with viscoelasticity (i.e., both viscosity and elasticity) and commonly has relatively weak intermolecular forces, generally low Young's modulus and high failure strain compared with other materials. The elastomer may be a crosslinked polymer. In a crosslinked polymer the separate polymer chains are tied together (crosslinked) typically leading to a single macromolecule. These chemical crosslinks may be normal crosslinks, which are covalent, and chemically bonding the polymer chains together into one molecule. However, the chemical crosslinks may also be, and are preferably formed by reversible crosslinks, which uses noncovalent, or secondary interactions between the polymer chains to bind them together. These interaction include hydrogen bonding and ionic bonding. The advantage of using noncovalent interactions to form crosslinks is that when the material is heated, the crosslinks are broken. This allows the material to be processed, and most importantly, recycled, and when the molten material cools again, the crosslinks reform. Examples of suitable polymers are polyisoprene, natural rubber, polybutadiene, polyisobutylene, and polyurethanes. Preferably, the elastic particles comprise ethylene-propylene rubber and/or ethylene-octene rubber and/or ethylene-propylene-diene terpolymer (EPDM). These materials have relatively good elastic and processing properties.

Preferably, any isotactic polypropylene (i-PP) conventionally employed in preparing polypropylene impact blends having a melt flow rate (MFR) of from about 0.001 to about 500 g/10 min. (230° C., 2160 g load as per ASTM D 1238) can be used in the core compositions of the panel according to this invention for forming the polymer matrix. Preferably, the isotactic polypropylene will have an MFR of from about 0.01 to about 200 g/10 min., more preferably from about 20 to about 200 g/10 min., and still more preferably from about 80 to about 200 g/10 min. As used in this specification, unless otherwise indicated, the term "about" means that the indicated values need not be exact, and they may be 10% greater or lower than the value shown. Normally, solid isotactic polypropylenes are preferably employed in the impact polypropylene composition of the present invention, i.e., polypropylenes of greater than 90% hot heptane insolubles. The particular density of the polypropylene is not critical. Preferred isotactic polypropylenes are normally crystalline and have densities ranging from about 0.90 to about 0.94 g/cc. Moreover, the composite material of the core, also referred to as alloy, can include several polypropylenes having different melt flow rates to provide a polypropylene impact blend having mechanical property characteristics as desired. As used herein, the term "isotactic polypropylene" is meant to include homopolypropylene, as well as copolymers of propylene and ethylene containing up to 8 weight percent of polymerized ethylene or other alpha-olefins.

Ethylene-propylene rubbers (EPR) may be used to compose at least a part of the elastic particles. An EPR is suitable to be mixed and covalently bonded to e.g. a polypropylene composition, constituting the main polymer matrix material. The term "elastomer" and its derivatives will be used interchangeably with the term "rubber" and its corresponding derivatives.

Examples of ethylene-propylene rubbers (EPR) which are particularly useful in the present invention include saturated ethylene-propylene binary copolymer rubbers (EPM) and ethylene-propylene-non-conjugated diene terpolymer rubbers (EPDM), having the above-mentioned characteristics and containing about 1 to about 5 weight percent of a diene such as 5-ethylidene-2-norborene, 5-methylene-2-norborene, 1,4-hexadiene, dicyclopentadiene (DCPD), and the like. As used in this patent specification and in the appended claims, the term "ethylene-propylene rubber" (abbreviated as "EPR") is intended to encompass all of the aforementioned rubber types, namely EPR, EPM, or EPDM, as well as mixtures thereof.

While any of the EPR's described above may be advantageously employed in the instant invention, lower Tg (glass transition temperature) EPR's are preferred. This is because lower Tg EPR's perform better in simple binary mixtures of i-PP and EPR. For example, the Izod and Gardner impact properties of ICP's which consist of 80% by weight i-PP and 20% by weight EPR are significantly improved by lowering the Tg of the EPR. As the Tg of such binary blends of i-PP and EPR decreases from about −37 to about −50° C., the Gardner impact measured at −29° C. increases. At the same time, stiffness, as measured by the heat distortion temperature (HDT) and flexural modulus, remain essentially unchanged. Thus the most preferred EPR's of the present invention will have the lowest Tg achievable for a given EPR.

The Tg of a polymer can be conveniently measured by methods well known in the art, for example by differential scanning calorimetry (DSC) or dynamic mechanical thermal analysis (DMT A) techniques. As used herein, Tg will be understood to refer to the value for Tg obtained using the DMTA method based the tan δ peak, which is well known in the art.

The Tg of an EPR can be readily controlled by varying its ethylene content. The lowest Tg for commercially produced EPR's, about −50° C., occurs within a range of from about 35 to about 70 weight percent ethylene. Above this range, Tg increases due to the development of polyethylene crystallinity. In a similar fashion, Tg also increases due to the development of polypropylene crystallinity as ethylene content drops below this range. Those skilled in the art will understand that the relationship between Tg and ethylene content is readily measurable and is a continuous, smooth-curve function. There is, therefore, no well-defined point above or below which the Tg abruptly changes as ethylene content changes. Also, the catalyst used to produce the EPR will determine the ethylene content required to give the lowest Tg value. For example, when vanadium-based or metallocene-based single site catalysts are used, the EPR having the lowest Tg will have an ethylene content of about 45-55 weight percent, the Tg being in this case about −50° C. On the other hand, with traditional Ziegler-Natta titanium-based catalysts, which are usually multi-sited, the EPR having the lowest Tg will have an ethylene content of about 65-68 weight percent and a Tg of about −47° C.

Therefore, in a preferred embodiment, the EPR of the present invention will have a polymerized ethylene content of from about 35 to about 70 percent by weight, where the term "about" is used to indicate that variation above 70 percent or below 35 percent is acceptable, so long as the Tg of the EPR is within 5 degrees of the minimum value obtainable with the catalyst being employed.

High density polyethylenes, traditionally known as "HDPE," are defined herein to include those polyethylenes where the density is equal to or above 0.940 g/cc. The high-density polyethylenes usable as the high density polyethylene (hereinafter HDPE) matrix material in the present invention preferably include those having a density of 0.940 g/cc or greater, preferably 0.945 g/cc or greater, more preferably, 0.950 g/cc or greater, and most preferably 0.955 g/cc or greater. Such HDPE's generally include ethylene homopolymers and copolymers of ethylene with alpha-olefins (preferably having 3 to 12 carbon atoms, more preferably 3 to 8 carbon atoms). Preferable alpha-olefins are propylene, butene-1, hexene-1, 4-methylpentene-1, and octene-1. Processes for making such polymers are well known in the art and include, for example, gas phase, slurry, and solution polymerization processes. The melt index of the HDPE determined under the conditions E according to ASTM D 1238 method, is generally 0.10 to 300 g/10 min., preferably 0.1 to 100 g/10 min., more preferably, 0.1 to 10 g/10 min. The molecular weight distribution (MWD) of the HDPE is not critical, although if the melt index of the HDPE is particularly low, it may be more desirable to use broader MWD HDPE's that are more shear-thinning and less viscous under extrusion conditions in order to facilitate melt mixing. An HDPE of this type that has been found to be suitable is Exxon HDZ-126, which has a melt index, as defined above, of about 0.35 g/10 min. and a density of 0.957 g/cc.

As mentioned above, am ethylene-propylene copolymer (hereinafter referred to either as "ethylene-propylene copolymer" or "EPC") may be used as matrix material in the panel according to the present invention. This EPC preferably comprises from about 10 to about 30 weight percent polymerized ethylene and from about 90 to about 70 weight percent polymerized propylene. Preferably, the ethylene-propylene copolymer will have a polymerized ethylene content of about 14% to about 27% by weight, and more preferably about 14% to about 20% by weight. The weight average molecular weight (Mw) of the ethylene-propylene copolymer is preferably in the range of from about 50,000 to about 500,000, more preferably from about 75,000 to about 300,000, and most preferably from about 100,000 to about 200,000.

The ethylene-propylene copolymer (EPC) of the invention may be prepared using metallocene or conventional Ziegler-Natta type catalysts. In either case, the polymerization may be carried out in gas phase, solution, or slurry polymerization processes. For example, a satisfactory process for preparing the ethylene-propylene copolymer comprises contacting ethylene and propylene monomers, under polymerization conditions and in such a ratio as to give the desired polymerized composition, with a metallocene catalyst which yields isotactic polypropylene having a tacticity greater than about 80 percent. An example of a metallocene catalyst is activated dimethylsilanyl bis(indenyl) hafnium dimethyl.

Alternatively, the inventive EPC may be prepared using a conventional Ziegler-Natta catalyst which can yield similar isotactic polypropylenes.

The core preferably comprises at least one mineralizer selected from the group consisting of: sodium hydroxide (NaOH), calcium chloride ($CaCl_2$)), aluminium sulphate ($Al_2(SO_4)_3$), and calcium hydroxide $Ca(OH)_2$. The panel according to the invention, in particular the core, may comprises cellulose based particles, in particular lignocellulose based particles, in particular fibres. Preferably, the cellulose based particles comprise wood, straw, and/or hemp. Previous research shows that wood and hemp are chemically heterogeneous and its components can be divided into two groups: structural components of high molecular weight-natural polymer substances (cellulose, hemicelluloses and lignin) which are the major cell wall components, and non-structural components of low molecular weight (extractives and inorganic components). Both wood and wood fibres comprise many chemical components, but it was found that the main inhibitor of core hydration is sugar. Several chemical treatments are preferably to the natural fibres, such as wood fibres or hemp fibres, before mixing them with the (initially fluid) polymer. The compressive strength and other mechanical properties of the treated wood fibre composites are higher than those of the untreated fibres. Chemicals such as sodium hydroxide (NaOH), calcium chloride ($CaCl_2$)), and aluminium sulphate ($Al_2(SO_4)_3$), sometimes also referred to as mineralization agents (mineralizers), typically improves compatibility of core and plant origin aggregates. Complex mineralizers such as $Al_2(SO_4)_3+Ca(OH)_2$ may also be applied. When $Al_2(SO_4)_3$ is used as a mineralizer, it impedes the release of sugar from organic aggregates and reduces hygroscopicity and water absorption. $Al_2(SO_4)_3$ in the form of hydrate is the characteristic of an acidic reaction in water, and calcium hydroxide [$Ca(OH)_2$] is characteristic of an alkaline reaction in water. The mineralization is achieved by enhancing the efficiency of $Al_2(SO_4)_3$, at least partially neutralizing the acidic environment caused by $Al_2(SO_4)_3$ and improving the workability of the mixture. Wood aggregate mineralization also leads to improved adhesion between the wood particles and the polymer, as a result of which are more stable, coherent polymer can be realized.

As mentioned above, at least a part of the cellulose based particles is formed by fibres. It is also imaginable that at least a part of the cellulose based particles is formed by powder, (wood) shavings, (wood) wool, and/or (wood) chips. Instead of wood, also other natural fibres may be used, such as hemp. Hemp enriched polymer also exhibit a relatively good thermal insulation material, excellent hydric properties, great acoustic capabilities, and good fire resistance. Here, typically hemp shiv is used as coarse aggregate (basic component). Like with wood, the hemp shiv is preferably mineralized by $Al_2(SO_4)_3$, neutralized with $Ca(OH)_2$ and mixed with the (initially fluid/liquid) polymer.

Preferably, the core and/or the backing layer comprises at least one filler chosen from the group consisting of: a mineral, preferably calcium carbonate; a pigment, a modifier, fibres, such as glass fibres, wood, straw, and/or hemp. The fibres may be loose fibres and/or interconnected fibres resulting in a woven or non-woven layer. The fibres may e.g. be glass fibres, coconut fibres, Kevlar fibres, nylon fibres, perlon fibres, sisal fibres, and/or fique fibres.

The core comprises preferably at least one additional filler selected from the group consisting of: steel, non-fibrous glass particles, polypropylene, wood, acrylic, alumina, curaua, carbon, cellulose, coconut, kevlar, nylon, perlon, polyethylene, PVA, rock wool, sisal, and fique. This may further increase the strength of the panel and/or the water resistivity and/or the fireproof properties of the panel as such.

Preferably, the core comprises sodium carboxymethyl cellulose (CMC). It was found that the addition of CMC to the core (during production) facilitates and even promotes self-degradation of said polymer based core, in particular a polymer, in an alkaline aqueous environment and at elevated temperature (200° C. or higher). Hence, this will improve the biodegradability of the panel. At this elevated temperature, CMC emitted two major volatile compounds, CO2 and acetic acid, creating a porous structure in core. CMC also reacted with NaOH from sodium silicate, if applied, to form three water-insensitive solid reaction products, disodium glycolate salt, sodium glucosidic salt, and sodium bicarbonate. Other water-sensitive solid reaction products, such as sodium polysilicate and sodium carbonate, were derived from hydrolysates of sodium silicate.

Preferably, the core comprises silica fume. Silica fume, also known as microsilica, is an amorphous (non-crystalline) polymorph of silicon dioxide, silica. It is an ultrafine powder collected as a by-product of the silicon and ferrosilicon alloy production and typically consists of spherical particles with an average particle diameter of 150 nm. By incorporation of silica fume in the core, in particular the main polymer, the water resistivity as well as the fireproof properties can be improved significantly. The silica fume may affect the compressive strength of the core though, as a result of which the amount of silica fume is preferably kept limited to an amount equal to or lower than 10% by weight.

The core may comprise iron oxide ($Fe_2O_3$), preferably in an amount of less than 6% by weight. Iron oxide imparts colour to core. Moreover, at a very high temperature, iron oxide chemically reacts with calcium and aluminium, which could also be present in the core, to form tricalcium alumino-ferrite, which material (tricalcium alumino-ferrite) improves hardness and strength of the core. Preferably, the amount of alumina ($Al_2O_3$) in the core is situated in between 3 and 8% by weight. Preferably, the amount of calcium sulphate needed for the aforementioned reaction will typically be between up to (and including) 0.5% by weight.

The core preferably comprises fatty acids. Fatty acids may penetrate through channels (pores) of raw minerals (if applied) before grinding, and will facilitate the (efficiency of the) grinding process to produce mineral based core powder.

The core may comprise at least one alkali metal sulfate, such as magnesium sulfate. This will commonly accelerate the production process of the core.

Preferably, the core comprises perlite, preferably expanded (foamed) perlite. Perlite is an amorphous volcanic glass that has a relatively high water content, typically formed by the hydration of obsidian. Perlite has the unusual property of greatly expanding when heated sufficiently, which could significantly reduce the density of the core, and hence of the panel as such. It is preferred that core comprises moreover foamed perlite of different particle size values. Closed cell foamed perlite may lead to the achievement of a porosity (of perlite) of 30-40%. Said perlite can be preliminarily processed by siliconic solutions, sodium, potassium and lithium silicates.

The core may moreover comprise one or more additive materials advantageously including surface active substances (SAS) such as methylcellulose, "Badimol" plasticizing materials and other cation-active SAS's for improving the rheology of the mixture. The core may also comprise bentonite, that is a finely ground natural product, adapted to increase rheology and waterproof characteristics of the panel as such.

The core may also comprise at least one fire-retardant additive. This fire-retardant additive is preferably formed by an organ halogen compound. Such compounds are able to remove reactive H and OH radicals during a fire. The organ halogen compound preferably comprises bromine and/or chlorine. Recommended from a viewpoint of fire retardance over an organochlorine compound such as PCB (polychlorinated biphenyl) is an organ bromine compound such as PBDE (polybrominated diphenyl ether). Other examples of applicable brominated compounds are: Tetrabromobisphenol A, Decabromodiphenyl ether (Deca), Octabromodiphenyl ether, Tetrabromodiphenyl ether, Hexabromocyclododecane (HBCD), Tribromophenol, Bis(tribromophenoxy) ethane, Tetrabromobisphenol A polycarbonate oligomer (TBBA or TBBPA), Tetrabromobisphenol A epoxy oligomer (TBBA or TBBPA), and Tetrabromophthalic acid anhydride. Other examples of applicable chlorinated compounds are: Chlorinated paraffin, Bis(hexachlorocyclopentadieno)cyclooctane, Dodecachloride pentacyclodecane (Dechlorane), and 1,2,3,4,7,8,9,10,13,13,14,14-dodecachloro-1,4,4a,5,6,6a,7,10,10a,11,12,12a-dodecahydro-1,4,7,10-dimethanodibenzo[a,e]cyclooctene (Dechlorane Plus). Although halogenated flame retardants are particularly effective, they generally have the drawback that toxic smoke can result in the case of fire. It is therefore also possible to envisage applying one or more alternative, less toxic fire-retardant additives, including intumescent (foaming) substances. The operating principle of these alternative additives is based on formation of a foam layer which functions as oxygen barrier and therefore also has a fire-retardant effect. Such intumescent additives generally comprise melamine or a salt derived therefrom. An example hereof is a mixture of polyphosphates (acid donor) in co-action with a melamine (foaming agent) and a carbon donor such as dipentaerythritol, starch or pentaerythritol. Gaseous products such as carbon dioxide and ammonia gas are formed here in the case of fire. The formed foam layer is stabilized by cross-linking, as in the case of vulcanization. Other examples of applicable, relatively environmentally-friendly, melamine-based additives are: melamine cyanurate, melamine polyphosphate and melamine phosphate.

In order to save weight, and therefore cost, it may be advantageous that the core is at least partially foamed. The foamed structure may comprises open pores (cells) and/or closed pores (cells).

The at least one reinforcement layer is preferably a non-woven layer or woven layer, in particular a cloth, for example made by fiberglass and/or textile. They may have a thickness of 0.2-0.4 mm. It is also conceivable that each tile comprises a plurality of the (commonly thinner) base layer stacked on top of each other, wherein at least one reinforcing layer is situated in between two adjacent base layers. Preferably, the density of the reinforcing layer is preferably situated between 1.000 and 2.000 kg/m$^3$, preferably between 1.400- and 1.900 kg/m$^3$, and more preferably between 1.400-1.700 kg/m$^3$. At least one reinforcement layer may comprise natural fibers, such as jute. At least one reinforcement layer comprises synthetic fibers, in particular polymer fibers, such as nylon fibers.

Preferably, the core comprises at least 50% by weight, preferably in between 50 and 90% by weight, of main polymer. Preferably, the core comprises in between 1 and 15% by weight of cellulose based fibers. Preferably, the core comprises in between 0 and 3% by weight of perlite. Preferably, the core comprises in between 1 and 8% by weight of reinforcement layer.

In a preferred embodiment, at least one core has a density greater than 1 kg/m$^3$. This relatively high density will commonly lead to strong and rigid panels. It is, however, also imaginable that at least one core has a density lower than 1 kg/m$^3$, which leads to a saving in weight and therefore in transporting and handling costs. The lower density can e.g. be achieved by applying one or more foamed ingredients, such as expanded perlite, expanded polystyrene, etc.

It is imaginable that the core is provided with a waterproof coating substantially covering the at least one core. This may further improve the waterproof properties of the panel as such. To this end, the waterproof coating may be a two-component liquid-applied waterproofing formulation for application as a liquid to at least one (outer surface of at least one) core. Typically, this coating comprises: separate components I and II which are transportable in separate containers and are combinable to form a blend in which vulcanization is initiated solidifying the components into a membrane wherein component I comprises an aqueous latex of a natural or synthetic rubber and component II comprises an oil carrier in which is dispersed a vulcanizing agent operative to cure the rubber in component I, and a hygroscopic agent operative to chemically bind the water in component I. Component I preferably comprises a latex stabilizer operative to increase the working life of the latex by controlling the initial pH of the latex components. It is also discovered that additions of potassium hydroxide (KOH) dissolved in minimal amounts in component I can lengthen the setting time, but excessive amounts may destabilize and cause premature gelation of the latex. A preferred addition rate, therefore, is up to 1.5 parts per 100 parts of rubber. It is believed that other high pH additives, such as ammonia or sodium hydroxide (NaOH) may be used. Accordingly, an exemplary component I of the invention may comprise 0 to 2.5 phr (per hundred parts rubber). Component II contains, among other things, an oil carrier fluid for the vulcanization agent and hygroscopic agent. In preferred embodiments, the oil carrier fluid is a blend of hydrocarbon oils, such as a blend of both aromatic and paraffinic compositions. The aromatic oils which preferentially swell the rubber particles are generally more viscous. Fluidity can be controlled by the addition of paraffinic oils of lower viscosity which also serve to adjust the setting time of the composition. In other exemplary embodiments, synthetic liquid plasticizers such as phthalates, adipates, or other commonly used rubber plasticizers can be used. The carrier fluid may also contain a proportion of bitumen, either oxidized or penetration grade. The level of aromatic oil is not likely to be less than 50% of the oil carrier fluid, and the bitumen not greater than 30%. The presence of the bitumen, however, is not critical to the invention. Also optional is the use of a hard synthetic or natural resin. The oil carrier fluid will comprise 20-60% by total weight of the formulation (when components I and II are combined). Component II typically contains a vulcanization agent or package. Preferably, the vulcanization package comprises elemental sulphur as the sulphur donor for the system, zinc oxide as a vulcanization activator, and a mixture of zinc iso-propyl xanthate (ZIX) and zinc dibutyl dithiocarbamate dibutylamine complex (ZDBCX) as accelerators. These may be used in the preferred ranges, respectively, 0.5 to 15.0 phr (parts sulphur based on parts hundred of rubber), 0.5 to 20.0 phr (ZnO), 0.1 to 5.0 phr (ZIX), and 0.1 to 5.0 phr (ZDBCX). Other known vulcanizing agents and/or packages are believed to be suitable for use in the invention. Component B may also comprise a hygroscopic agent or dessicant for chemically binding the water of component I. The preferred hygroscopic agent is calcium oxide. Other hygroscopic agents may include other metal oxides which react with water to form hydroxides, e.g., magnesium, barium, etc. Hydraulic cores, such as Portland core, or high alumina core, calcium sulphate core (plaster of paris), magnesium oxide, or magnesium oxychloride core, may also be used. The hygroscopic agent may also comprise anhydrous salts which absorb significant proportions (25% or more) of their own weight of water, such as borax. The weight of the hygroscopic agent is chosen to effectively dewater the latex, with preferably a slight excess to ensure that the water is bound up. However, it is possible that partial desiccation of the latex may be used, i.e., less than stoichiometric quantities of hygroscopic agent used. The hygroscopic agent, depending upon which is chosen, can comprise 10-50% of the total formulation system. Component B may also comprise one or more rheology modifiers. Preferably, a combination of montmorillonite clay (activated with a chemical activator) and stearate-coated calcium carbonate is used to achieve the desired balance of rheological properties, although other options, such as organo-treated bentonite clays, fumed silica, polymer fibers, ground rubber, pulverized fly ash, hollow glass microspheres, and hydrogenated castor oils, could be employed. The amount of rheology modifiers, depending upon the material chosen, could comprise 0.5 to 25.0% weight total solids in the formulation system (components I and II combined).

It is also conceivable that a waterproof layer is situated in between the core and the top structure. This may further improve the waterproof properties of the panel as such. The waterproof layer may have the same composition as the composition of the waterproof coating described above, but may also be formed by a polymer layer, such as a PVC layer.

It is not unlikely that core comprises a plurality of reinforcement layers. For example, at least one first reinforcement layer may be located in a top portion of the core, and wherein at least one second reinforcement layer may be located in a bottom portion of the core.

It is imaginable that the core comprises a laminate of cores, which are either directly and/or indirectly, stacked onto each other. The cores may have an identical composition, though may also have mutually different compositions, which allows the properties for each core to be tweaked and to be adapted for its own primary function (e.g. sound-dampening, providing strength, providing flexibility, etc.).

The top structure is preferably adhered onto the core by means of a waterproof adhesive. This makes shields the core(s) from water applied to the top structure, which renders the panel as such more waterproof. Moreover, this prevents that the top structure easily delaminates from the core.

The (decorative) top structure preferably comprises at least one decorative layer and at least one transparent wear layer covering said decorative layer. A lacquer layer or other protective layer may be applied on top of said wear layer. A finishing layer may be applied in between the decorative layer and the wear layer. The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities. Customized appearances, often realized by digital printing during the panel production process, are also imaginable. The decorative top structure may also be formed by a single layer. In an alternative embodiment, the decorative top structure is omitted, thus not applied, in the panel according to the invention. In this latter embodiment, the decorative panel, in particular a floor panel, ceiling panel or wall panel, comprising: a core provided with an upper side and a lower side, a first panel edge comprising a first coupling profile, and a second panel edge comprising a second coupling profile being designed to engage interlockingly with said first coupling profile of an adjacent panel, both in horizontal direction and in vertical direction, wherein said core comprises: at least one core comprising: at least one polymer, cellulose based particles dispersed in said polymer; and at least one reinforcement layer embedded in said core.

Preferably, the panel comprises a backing layer attached, directly or indirectly, to a rear side of the core. The at least one backing layer is preferably at least partially made of a flexible material, preferably an elastomer. The thickness of the backing layer typically varies from about 0.1 to 2.5 mm. Non-limiting examples of materials whereof the backing layer can be made of are polyethylene, cork, polyurethane and ethylene-vinyl acetate. The thickness of a polyethylene backing layer is for example typically 2 mm or smaller. The backing layer commonly provides additional robustness, dimensional stability, and/or impact resistances to the panel as such, which increases the durability of the panel. Moreover, the (flexible) backing layer may increase the acoustic (sound-dampening) properties of the panel.

The backing layer preferably comprises at least one polymer and at least one plasticizer. The backing layer may also comprise a plurality of different plasticizers. It is imaginable that at least one polymer and/or at least one plasticizer used in the backing layer is a recycled and/or biobased material. Preferably, at least one polymer of the backing layer is formed by a polymer chosen from the group consisting of: PVC (polyvinyl chloride), PUR (polyurethane), PVB (polyvinyl butyral), polyolefin, in particular PE or PP. The backing layer may comprise one additional plasticizer selected from the group consisting of: DOTP, DINP, DIDP. Preferably, the backing layer comprises 100 parts of polyvinyl chloride and from 20 to 200 parts of total plasticizer.

Preferably, at least one reinforcement layer extends in only one coupling profile of the first and second coupling profile. This can be realized by designing the first coupling profile and the second coupling profile in such a way that a vertically extending tongue-groove (fold-down) connection is formed, typically by using an upper profile and a lower profile, a preferred example of which will be given below. The advantage of applying the reinforcing layer in only one coupling profile, typically aforementioned lower profile, and thus not in the complementary coupling profile, typically aforementioned upper profile, is that the flexibility of the one profile (upper profile) is greater than the flexibility of the other profile (lower profile). This typically means that the upper profile is easier to deform than the lower profile, and this is in particular advantageous in case deformation is needed to realize a coupling between the coupling profiles.

Preferably, the first coupling profile comprises:
a first upward tongue,
at least one first upward flank lying at a distance from the upward tongue,
an upward groove formed in between the upward tongue and the upward flank wherein the upward groove is adapted to receive at least a part of a downward tongue of a second coupling profile of an adjacent panel, and preferably at least one first locking element, more preferably provided at a distant side of the upward tongue facing away from the first upward flank and/or provided at the first upward flank, and, preferably, the second coupling profile comprises:
a second downward tongue,
at least one second downward flank lying at a distance from the downward tongue,
a second downward groove formed in between the downward tongue and the downward flank, wherein the downward groove is adapted to receive at least a part of an upward tongue of a first coupling profile of an adjacent panel, and
preferably at least one second locking element adapted for co-action with a first locking element of an adjacent panel, said second locking element more preferably being provided at the downward flank and/or provided at a distant side of the second downward tongue (facing away from the second downward groove).

This allows the first and second coupling profile to be coupled by means of a lowering motion (fold-down motion). Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition. Examples of plastics suitable to generate friction include:

Acetal (POM), being rigid and strong with good creep resistance. It has a low coefficient of friction, remains stable at high temperatures, and offers good resistance to hot water;
Nylon (PA), which absorbs more moisture than most polymers, wherein the impact strength and general energy absorbing qualities actually improve as it absorbs moisture. Nylons also have a low coefficient of friction, good electrical properties, and good chemical resistance;
Polyphthalamide (PPA). This high performance nylon has through improved temperature resistance and lower moisture absorption. It also has good chemical resistance;
Polyetheretherketone (PEEK), being a high temperature thermoplastic with good chemical and flame resistance combined with high strength. PEEK is a favorite in the aerospace industry;
Polyphenylene sulfide (PPS), offering a balance of properties including chemical and high-temperature resistance, flame retardance, flowability, dimensional stability, and good electrical properties;
Polybutylene terephthalate (PBT), which is dimensionally stable and has high heat and chemical resistance with good electrical properties;
Thermoplastic polyimide (TPI) being inherently flame retardant with good physical, chemical, and wear-resistance properties.
Polycarbonate (PC), having good impact strength, high heat resistance, and good dimensional stability. PC also has good electrical properties and is stable in water and mineral or organic acids; and
Polyetherimide (PEI), maintaining strength and rigidity at elevated temperatures. It also has good long-term heat resistance, dimensional stability, inherent flame retardance, and resistance to hydrocarbons, alcohols, and halogenated solvents.

It is imaginable that the first coupling profile and the second coupling profile are configured such that in coupled condition a pretension is existing, which forces coupled panels at the respective edges towards each other, wherein this preferably is performed by applying overlapping contours of the first coupling profile and the second coupling profile, in particular overlapping contours of downward tongue and the upward groove and/or overlapping contours of the upward tongue and the downward groove, and wherein the first coupling profile and the second coupling profile are configured such that the two of such panels can be coupled to each other by means of a fold-down movement and/or a vertical movement, such that, in coupled condition, wherein, in coupled condition, at least a part of the downward tongue of the second coupling profile is inserted in the upward groove of the first coupling profile, such that the downward tongue is clamped by the first coupling profile and/or the upward tongue is clamped by the second coupling profile.

Preferably, the panel comprises at least one third coupling profile and at least one fourth coupling profile located respectively at a third panel edge and a fourth panel edge, wherein the third coupling profile comprises:
a sideward tongue extending in a direction substantially parallel to the upper side of the core,
at least one third downward flank lying at a distance from the sideward tongue, and
a third downward groove formed between the sideward tongue and the third downward flank,
wherein the third coupling profile and the fourth coupling profile are configured such that two of such panels can be coupled to each other by means of a turning movement (angling-down movement). Optionally, the third coupling profile is provided with at least one third locking element, such as a bulge and/or recess, which may be provided at the third downward flank and/or at a distant wall part, facing away from the third downward groove, which is located above the sideward tongue and/or makes part of the sideward tongue. The third locking element, if applied, is configured to co-act with a complementary locking element of another coupling profile of another panel, in coupled condition of said panels.

Preferably, the fourth coupling profile comprises a fourth groove configured for accommodating at least a part of the sideward tongue of the third coupling profile of an adjacent panel, said fourth groove being defined by an upper lip and a lower lip, wherein said lower lip is provided with an upward locking element, wherein, in coupled condition: at least a part of the sideward tongue of a first panel is inserted into the fourth groove of an adjacent, second panel, and wherein at least a part of the upward locking element of said second panel is inserted into the third downward groove of said first panel. A fourth locking element may be provided at a distant side of the upward locking element facing away from the fourth groove, wherein said fourth locking element is configured to co-act with a locking element of a complementary coupling profile, in particular a second locking element of a second coupling profile of another panel, in coupled condition of said panels.

The first coupling profile and the fourth coupling profiles may have different shapes. For example, the first coupling profile may not be suitable to accommodate the sideward tongue, but only the second downward tongue of the second coupling profile. This leads to (at least) four different coupling profiles. However, it is imaginable, and even preferable, that the first coupling profile and the fourth coupling profile are identical. This is for in particular possible in case the first coupling profile is configured to co-act with the third coupling profile, and hence is configured to accommodate the sideward tongue. In this latter case, the upward tongue is formed by the upward locking element. This embodiment has the advantage that the first/fourth coupling profile (female profile) is configured to co-act with both the second coupling profile (first male profile) and the third coupling profile (second male profile). This provides an enormous increase in how all panels are mutually oriented in a tile covering to be realized. The classical row by row installation of panel is still possible, but the compatibility of the first/fourth coupling profile with both the second coupling profile and the third coupling profile also allows the installation of various alternative installation patterns, such as for example, but not limited to, a herringbone pattern, while needing and using only a single panel type. In case of oblong (rectangular) tiles, the short edge of a panel can for example be coupled to either a short edge or to a long edge of an adjacent panel. Furthermore, each panel can be manufactured in a relatively cost-efficient manner, since only three different coupling profiles, instead of the usual four different coupling profiles, will have to be realized during the production process, which will lead to at least a cost-saving in the machinery, and in particular the milling tools, which are used during the production process.

Preferably, at least a part of the proximal side of the upward tongue facing the upward flank is upwardly inclined away from said upward flank, and/or wherein at least a part of the proximal side of the upward locking element facing the upper lip is upwardly inclined away from said upper lip. This will typically lead to a so-called open-groove coupling system. It is also imaginable that at least a part of the proximal side of the upward tongue facing the upward flank is upwardly inclined towards said upward flank, and/or wherein at least a part of the proximal side of the upward locking element facing the upper lip is upwardly inclined towards said upper lip. This will typically lead to a so-called closed-groove coupling system.

Preferably, at least a part of the proximal side of the second downward tongue facing the second downward flank is downwardly inclined away from said second downward flank, and/or wherein at least a part of the proximal side of the sideward tongue facing the third downward flank is downwardly inclined away from said third downward flank. Alternatively, or additionally, it is also imaginable that at least a part of the proximal side of the second downward tongue facing the second downward flank is downwardly inclined towards said second downward flank, and/or wherein at least a part of the proximal side of the sideward tongue facing the third downward flank is downwardly inclined towards said third downward flank.

The panel, typically the core, in particular at least one core, preferably comprises recycled material. Recycled material typically relates to reusing left-over material resulting from prior (panel) production processes.

The core preferably has a thickness of at least 3 mm, preferably at least 4 mm, and still more preferably at least 5 mm. The panel thickness is typically situated in between 3 and 10 mm, preferably in between 4 and 8 mm.

Polyvinyl butyral (PVB) is an amorphous random copolymer of vinyl butyral, vinyl alcohol, and vinyl acetate, mainly used in laminated safety glass in automotive, aerospace and architectural glass sections. The chemical structure of PVB may influence the plasticizing properties of PVB. The vinyl butyral unit is hydrophobic and promotes good processibility, toughness, elasticity and compatibility with many plasticizers and polymers, such as PVB and PU. The hydrophilic vinyl alcohol and vinyl acetate units are typically responsible for high adhesion to inorganic materials such as one or more inorganic fillers chosen from the group consisting of: glass fibres, chalk (calcium carbonate), stone dust, rock wool, and metal; which may be present in the core. Preferably, at least a fraction of the polyvinyl butyral (PVB) of the plasticizer is formed by recycled polyvinyl butyral obtained from windshields. Preferably, at least a fraction of the polyvinyl butyral (PBV) used in the plasticizer composition is plasticized polyvinyl butyral, in particular recycled plasticized polyvinyl butyral. Possible plasticizer to plasticize PVB are, dibutyl sebacate, and di-2-ethylhexanoate of triethylene glycol. Alkyl phthalate would also work as plasticizer due is commonly less preferred for health reasons.

At least one main polymer is preferably at least partially formed by recycled foamed polyurethane, preferably obtained from footwear. More preferably, this foamed polyurethane is machined foam, preferably from the footwear industry, that was not extruded or injection moulded prior to production of the core of the panel according to the invention.

In a preferred embodiment, the main polymer is at least partially foamed by the plasticizer composition, in particular by polyvinyl butyral of the plasticizer composition. Tests have surprisingly shown that polyvinyl butyral could act as foaming agent to foam the main polymer, in particular polyurethane. The core may comprise at least one (additional or alternative) blowing agent, in particular a carbon dioxide and/or nitrogen based blowing agent. Typically, this blowing agent is injected during the production process, in particular during or directly after extrusion of the core. Examples of a nitrogenous blowing agent are azo-compounds such as azodicarbonamide, azobisisobutyronitrile, diazoaminobenzene; N-nitroso compounds such as N,N'-dimethyl-N,N'-dinitrosoterephthalamide, N,N'-dinitroSo-pentamethylenetetramine; sulfonyl hydrazides such as benzene-1,3-disulfonyl hydrazide, diphenylsulfon-3,3'-disulfonyl hydrazide, 4,4'-oxybis.

Optionally, the plasticizer composition may comprise at least one acid catalyst. This acid catalyst will typically hasten the cure of the expandable or expanded core composition. Examples of an acid catalyst are para-toluene sulfonic acid, formic, acetic, propionic, maleic, tartaric, trichloroacetic, and the mineral acids Such as phosphoric, hydrochloric, hydrobromic, sulfuric, nitric, acid salts, esters, and the like. Preferably, an acid catalyst is chosen which is preferred from a health point of view. The proportion of acid catalyst is often not critical and may e.g. range from as little as 0.01% for the strong mineral acids up to about 5% or more for the weaker acids.

It is conceivable that at least a fraction of the plasticizer composition defines a matrix which is at least partially filled with the main polymer. For example, in case residue of rigid polyurethane foam (PUr) is used as (part of the) main polymer, this PUr is typically reticulated (netted) and does therefore not melt during processing. A PVB based matrix is typically easy to produce and can be used to accommodate at least a part of the PUr, the latter being considered as (rigid) filler in this case. Higher concentrations of filler promotes an increased viscosity of the PVB-PUr composite. In this case, the mass proportions (in wt. %) of PVB/PUr may typically range from 80/20 to 50/50. Typically, the elastic moduli of PVB and PUr are very close, as a result of which mixing or blending these two polymers does not seriously change this mechanical property. PUr is typically a thermoset foam with crosslinked bonds, which are often an obstacle to fusion melting/softening during processing. Hence PUr is typically considered as a rigid filler in the composite compared to the plasticized PVB matrix. During high injection pressures used during production of the PVB/PUr composite, due to the breaking or tearing of the PUr particles caused by this pressure and compression of the composite, a reduction of porosity can be obtained, and a bigger fraction of rigid filler considering a certain volume, which improves the composite stiffness (if desired).

The invention also relates to a decorative covering, in particular a decorative floor covering, decorative ceiling covering, or decorative wall covering, comprising a plurality of mutually coupled decorative panels according to the invention. The covering may also be installed at vertical corners, such as at inside corners of intersecting walls, pieces of furniture, and at outside corners, such as at entry ways.

The invention further relates to the use of at least one plasticizer composition comprising polyvinyl butyral (PVB), preferably in a content of 35-65 wt. %, and preferably one or more admixed copolymers, preferably in a content of 65-35 wt. %, in a material layer of a panel, preferably an interlockable panel, according to the invention. Preferably, use of made of a blend of at least one main polymer and at least one plasticizer composition comprising polyvinyl butyral (PVB), preferably in a content of 35-65 wt. %, and preferably one or more admixed copolymers, preferably in a content of 65-35 wt. %, is used in a material layer of a panel, preferably an interlockable panel, according to the invention, wherein, more preferably, polyvinyl butyral (PVB) and/or another plasticizer is used to foam at least one main polymer.

The ordinal numbers used in this document, like "first", "second", and "third" are used only for identification purposes. Hence, the use of e.g. the expressions "third locking element" and "second locking element" does therefore not necessarily require the co-presence of a "first locking element".

The decorative panels according to the invention may also be referred to as decorative tiles. By "complementary" coupling profiles is meant that these coupling profiles can cooperate with each other. However, to this end, the complementary coupling profiles do not necessarily have to have complementary forms. By locking in "vertical direction" is meant locking in a direction perpendicular to the plane of the panel. By locking in "horizontal direction" is meant locking in a direction perpendicular to the respective coupled edges of two panels and parallel to or falling together with the plane defined by the panels.

Various other embodiments of the panel according to the invention are set out in the non-limitative clauses presented below.

1. Decorative panel, in particular a floor panel, ceiling panel or wall panel, comprising:
   a core provided with an upper side and a lower side,
   as an optional feature, a decorative top structure affixed on said upper side of the core,
   a first panel edge comprising a first coupling profile, and a second panel edge comprising a second coupling profile being designed to engage interlockingly with said first coupling profile of an adjacent panel, both in horizontal direction and/or in vertical direction, and preferably in both horizontal direction and vertical direction,
   wherein the panel, in particular the core, comprises at least one material layer which comprises:
   at least one main polymer, and
   at least one plasticizer composition which comprises polyvinyl butyral (PVB), preferably in a content of 35-65% % by weight of the plasticizer composition, and one or more admixed copolymers other than and/or different from the main polymer, preferably in a content of 65-35% by weight of the plasticizer composition.
2. Panel according to clause 1, wherein the first and second coupling profiles are part of the material layer.
3. Panel according to clause 1 or 2, wherein the polyvinyl butyral component is recycled polyvinyl butyral, virgin polyvinyl butyral or a mixture thereof.
4. Panel according to clause 2 or 3, wherein the admixed copolymers are selected from the group consisting of:
   Ethylene vinyl alcohol Copolymer Resins;
   Ethylene copolymer based compatibilizers;
   A modified ethylene acrylate carbon monoxide terpolymer composition comprising ethylene vinyl acetates (EVAs), polyethylenes, metallocene polyethylenes, ionomers, ethylene propylene rubbers and polypropylenes;
   Functional polymers working as compatibilization promoter for polar polymers, ethylene vinyl acetate copolymer;
   and/or mixtures thereof.
5. Panel according to one of the clauses 2-4, wherein the admixed copolymer is an Ethylene vinyl alcohol Copolymer Resin, optionally combined with one or more other admixed copolymer(s).
6. Panel according to one of the clauses 2-5, wherein the plasticizer composition comprises 40-60 wt. % PVB an 60-40 wt. % admixed copolymer(s) or preferably 45-55 wt. % PVB and 55-45 wt. % admixed copolymer(s) or more preferred 50 wt. % PVB and 50 wt. % admixed copolymer(s).
7. Panel according to one of the preceding clauses, wherein at least one material layer of the panel, in particular of the core, comprises 20-90 wt. %, preferably 25-90 wt. % main polymer and 10-80 wt. %, preferably 10-75 wt. %, plasticizer composition, preferably 30-50 wt. % plasticizer composition, and most preferably the core comprises 100 parts polyvinyl chloride as a main polymer and from 20 to 400 parts, preferably 20 to 200 parts, of a plasticizer composition.
8. Panel according to one of the preceding clauses, wherein the construction polymer is selected from the group consisting of: polyvinyl chloride (PVC), polypropylene (PP), polyurethane (PU), acryl butadiene styrene (ABS), polystyrene, preferably expanded polystyrene, or polyethylene (PE) and/or mixtures thereof.
9. Panel according to one of the preceding clauses, wherein the plasticizer composition further comprises one or more additional plasticizers chosen from the group consisting of:

An ortho-phthalate with an alkyl chain backbone having at least 7 carbon atoms, in particular DPHP (bis(2-propyl heptyl phthalate)), DIUP (disoundecylphtalate), or DTDP (disotridecyl phthalate); Di-isodecyl phthalate (DIDP), Di-isononyl phthalate (DINP);

A terephthalate, preferably (DOTP (Dioctyl terephthalate);

A cyclohexanoate, preferably DC9CH (cyclohexanoate diester);

A citrate, preferably ATBC (acetyl tributyl citrate) tripentyl acetyl citrate (ATPC), trihexyl acetyl citrate (ATHC), triheptyl acetyl citrate (ATHC), trioctyl acetyl citrate (ATOC), trinonyl acetyl citrate (ATNC);

An adipates, preferably DOA (dioctyl adipates) or Bis(2-ethyl hexyl adipate),

A phosphate ester, preferably TPP (triphenyl phosphate);

An azelate, preferably DiDA (di iso decyl adipates) or dioctyl azelate or di-2-ethylhexyl azelate;

A trimellitate, preferably TOTM (Tris (2-Ethylhexyl) Trimellitate), tributyl trimellitate (TBTM), triisobutyl trimellitate (TiBTM), triethylhexyl trimellitate (TEHTM), triisononyl trimellitate (TINTM);

A dibenzoate, preferably ODEDB (oxydiethylene dibenzoate) or OXPDB (oxydipropyl benzoate); 1,2-benzenedicarboxylic acid.

10. Panel according to one of the preceding clauses, wherein the main polymer and/or the plasticizer composition is a recycled material and/or is a biobased material.

11. Panel according to one of the preceding clauses, wherein the main polymer and the components of the plasticizer composition form a homogeneously intermixed material, preferably having a microstructure that is similar to an alloy structure of metals.

12. Panel according to one of the previous clauses, wherein the core comprises at least one compatibilizer to improve the compatibility between the at least one polymer and the at least one plasticizer composition.

13. Panel according to one of the previous clauses, wherein the panel comprises a backing layer applied, directly or indirectly, to a rear surface of the core, wherein said backing layer comprises at least one polymer and at least one plasticizer.

14. Panel according to clause 13, wherein the backing layer further comprises a plurality of plasticizers chosen from the group consisting of An ortho-phthalate with an alkyl chain backbone having at least 7 carbon atoms, in particular DPHP (bis(2-propyl heptyl phthalate)), DIUP (disoundecylphtalate), or DTDP (disotridecyl phthalate); Di-isodecyl phthalate (DIDP), Di-isononyl phthalate (DINP);

A terephthalate, preferably (DOTP (Dioctyl terephthalate);

A cyclohexanoate, preferably DC9CH (cyclohexanoate diester);

A citrate, preferably ATBC (acetyl tributyl citrate) tripentyl acetyl citrate (ATPC), trihexyl acetyl citrate (ATHC), triheptyl acetyl citrate (ATHC), trioctyl acetyl citrate (ATOC), trinonyl acetyl citrate (ATNC);

An adipates, preferably DOA (dioctyl adipates) or Bis(2-ethyl hexyl adipate),

A phosphate ester, preferably TPP (triphenyl phosphate);

An azelate, preferably DiDA (di iso decyl adipates) or dioctyl azelate or di-2-ethylhexyl azelate;

A trimellitate, preferably TOTM (Tris (2-Ethylhexyl) Trimellitate), tributyl trimellitate (TBTM), triisobutyl trimellitate (TiBTM), triethylhexyl trimellitate (TEHTM), triisononyl trimellitate (TINTM);

A dibenzoate, preferably ODEDB (oxydiethylene dibenzoate) or OXPDB (oxydipropyl benzoate); and 1,2-benzenedicarboxylic acid), 15. Panel according to one of the previous clauses 13-14, wherein at least one polymer and/or at least one plasticizer used in the backing layer is a recycled material.

16. Panel according to one of the previous clauses 13-15, wherein at least one polymer and/or at least one plasticizer used in the backing layer is a biobased material.

17. Panel according to one of the previous clauses 13-16, wherein at least one polymer of the backing layer is formed by PVC (polyvinyl chloride).

18. Panel according to one of the previous clauses 13-17, wherein at least one polymer of the backing layer is formed by PUR (polyurethane).

19. Panel according to one of the previous clauses 13-18, wherein at least one polymer of the backing layer is formed by PVB (polyvinyl butyral).

20. Panel according to one of the previous clauses 13-19, wherein at least one polymer of the backing layer is formed by a polyolefin, in particular PE or PP.

21. Panel according to one of the previous clauses 13-20, wherein the backing layer comprises one additional plasticizer selected from the group (B) consisting of: DOTP, DINP, DIDP.

22. Panel according to one of the previous clauses 13-21, wherein the backing layer comprises 100 parts of polyvinyl chloride and from 20 to 200 parts of total plasticizer.

23. Panel according to one of the previous clauses, wherein the core comprises at least one compatibilizer to improve the compatibility between the at least one polymer and the at least one plasticizer.

24. Panel according to one of the previous clauses, wherein the core and/or the backing layer comprises at least one filler chosen from the group (C) consisting of: a mineral, preferably calcium carbonate; a pigment, a modifier, fibres.

25. Panel according to one of the previous clauses, wherein the core and/or the backing layer comprises cellulose based particles, which preferably comprise lignocellulose, such as wood or hemp.

26. Panel according to one of the previous clauses, wherein the core comprises at least one additional filler selected from the group (D) consisting of: steel, glass, polypropylene, wood, acrylic, alumina, curaua, carbon, cellulose, coconut, kevlar, nylon, perlon, polyethylene, PVA, rock wool, sisal, and fique.

27. Panel according to one of the previous clauses, wherein at least one polymer of the core is foamed.

28. Panel according to one of the previous clauses, wherein the core comprises perlite, preferably expanded perlite.

29. Panel according to one of the previous clauses, wherein the core comprises at least one fire-retardant additive.

30. Panel according to one of the previous clauses, wherein the panel comprises at least one reinforcement layer, preferably a non-woven layer or woven layer, in particular a cloth.
31. Panel according to clause 30, wherein the reinforcement layer comprises fiberglass.
32. Panel according to one of the previous clauses 30-31, wherein the reinforcement layer comprises natural fibers, such as jute.
33. Panel according to one of the previous clauses 30-32, wherein the reinforcement layer comprises synthetic fibers, in particular polymer fibers.
34. Panel according to one of the previous clauses 30-33, wherein the at least one reinforcement layer is embedded in the core.
35. Panel according to one of the previous clauses, wherein the core comprises in between 1 and 15% by weight of cellulose based fibers.
36. Panel according to one of the previous clauses, wherein the core comprises in between 0 and 3% by weight of perlite.
37. Panel according to one of the previous clauses, wherein the core comprises in between 1 and 8% by weight of reinforcement layer.
38. Panel according to one of the previous clauses, wherein at least one core has a density greater than 1 $kg/m^3$.
39. Panel according to one of the previous clauses, wherein at least one core has a density lower than 1 $kg/m^3$.
40. Panel according to one of the previous clauses, wherein the core is provided with a waterproof coating substantially covering the at least one core.
41. Panel according to one of the previous clauses, wherein a top surface of the core is covered by a barrier layer which is substantially impermeable for at least one plasticizer used in the core.
42. Panel according to one of the previous clauses, wherein a waterproof layer is situated in between the core and the top structure.
43. Panel according to one of the previous clauses, wherein the panel comprises a plurality of reinforcement layers, wherein, preferably, at least one first reinforcement layer is located in a top portion of the core, and wherein at least one second reinforcement layer is located in a bottom portion of the core.
44. Panel according to one of the previous clauses, wherein the core comprises a laminate of cores, which are either directly and/or indirectly, stacked onto each other.
45. Panel according to one of the previous clauses, wherein the core comprises a laminate of cores, wherein the composition of at least two cores is mutually different.
46. Panel according to one of the previous clauses, wherein the top structure is adhered onto the core by means of a waterproof adhesive.
47. Panel according to one of the previous clauses, wherein the top structure comprises at least one decorative layer and at least one transparent wear layer covering said decorative layer.
48. Panel according to clause 47, wherein the wear layer has a melt temperature of above 100 degrees Celsius, wherein the wear layer is preferably made of polyurethane.
49. Panel according to one of the previous clauses, wherein at least one reinforcement layer extends in only one coupling profile of the first and second coupling profile.
50. Panel according to one of the previous clauses, wherein the panel thickness is situated in between 2 and 10 mm, preferably in between 3 and 10 mm.
51. Panel according to one of the previous clauses, wherein the first coupling profile comprises:
    an upward tongue,
    at least one upward flank lying at a distance from the upward tongue,
    an upward groove formed in between the upward tongue and the upward flank wherein the upward groove is adapted to receive at least a part of a downward tongue of a second coupling profile of an adjacent panel, and
    at least one first locking element, preferably provided at a distant side of the upward tongue facing away from the upward flank,
    and wherein the second coupling profile comprises:
    a first downward tongue,
    at least one first downward flank lying at a distance from the downward tongue,
    a first downward groove formed in between the downward tongue and the downward flank, wherein the downward groove is adapted to receive at least a part of an upward tongue of a first coupling profile of an adjacent panel, and
    at least one second locking element adapted for co-action with a first locking element of an adjacent panel, said second locking element preferably being provided at the downward flank.
52. Panel according to any of the previous clauses, wherein the panel comprises at least one third coupling profile and at least one fourth coupling profile located respectively at a third panel edge and a fourth panel edge, wherein the third coupling profile comprises:
    a sideward tongue extending in a direction substantially parallel to the upper side of the core,
    at least one second downward flank lying at a distance from the sideward tongue, and
    a second downward groove formed between the sideward tongue and the second downward flank,
    wherein the fourth coupling profile comprises:
    a third groove configured for accommodating at least a part of the sideward tongue of the third coupling profile of an adjacent panel, said third groove being defined by an upper lip and a lower lip, wherein said lower lip is provided with an upward locking element,
    wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.
53. Panel according to one of the previous clauses, wherein the panel is flexible or semi-flexible.
54. Panel according to one of the previous clauses, wherein the core comprises a mixture of three kinds of terephthalate-based material; and epoxidized oil, wherein weight ratio of the terephthalate-based material and the epoxidized oil is preferably from 99:1 to 1:99.
55. Panel according to one of the foregoing clauses, wherein the core comprises oil, preferably epoxidized oil, more preferably at least one epoxidized oil selected from the group (E) consisting of: epoxidized soybean oil, epoxidized castor oil, epoxidized linseed oil, epoxidized palm oil, epoxidized stearic acid, epoxidized oleic acid, epoxidized tall oil, epoxidized linoleic acid or mixtures thereof.
56. Panel according to one of the previous clauses, wherein the core comprises sodium carboxymethyl cellulose (CMC).
57. Panel according to one of the previous clauses, wherein the core comprises at least one additive chosen from the group consisting of: silica fume, iron oxide, fatty acids, and alkali metal sulphate, in particular magnesium sulphate.
58. Panel according to one of the previous clauses, wherein the main polymer is at least partially foamed by the plasticizer composition.
59. Panel according to one of the previous clauses, wherein the core comprises at least one blowing agent, in particular a carbon dioxide and/or nitrogen based blowing agent.
60. Panel according to one of the previous clauses, wherein at least a fraction of the plasticizer composition defines a matrix which is at least partially filled with the main polymer.
61. Panel according to one of the previous clauses, wherein at least a fraction of the polyvinyl butyral (PVB) of the plasticizer is formed by recycled polyvinyl butyral obtained from windshields.
62. Panel according to one of the previous clauses, wherein at least a fraction of the polyvinyl butyral (PBV) used in the plasticizer composition is plasticized polyvinyl butyral, in particular recycled plasticized polyvinyl butyral.
63. Panel according to one of the previous clauses, wherein at least one main polymer is at least partially formed by recycled foamed polyurethane obtained from footwear.
64. Decorative covering, in particular a decorative floor covering, decorative ceiling covering, or decorative wall covering, comprising a plurality of mutually coupled decorative panels according to any of clauses 1-63.

BRIEF DESCRIPTION OF THE DRAWINGS

The invention will be elucidated on the basis of non-limitative exemplary embodiments shown in the following figures, wherein:

FIG. 1b shows a schematic representation of a multi-purpose panel system comprising a plurality of multi-purpose panels as shown in FIG. 1a;

FIG. 2b shows a schematic representation of a multi-purpose panel system comprising a plurality of multi-purpose panels as shown in FIG. 2a;

FIG. 3b shows a schematic representation of a multi-purpose panel system comprising a plurality of multi-purpose panels as shown in FIG. 3a;

FIG. 4a shows a cross-section along line A-A of a multi-purpose panel as shown in FIG. 1a, 2a or 3a;

FIG. 4b shows a cross-section along line B-B of a multi-purpose panel as shown in FIG. 1a, 2a or 3a;

FIGS. 5a-5c show a cross-section of two multi-purpose panels as shown in FIG. 1a, 2a or 3a in a first, second and third coupled condition respectively;

FIGS. 7a-7c show a cross-section of two multi-purpose panels with further alternative coupling profiles in a first, second and third coupled condition respectively FIG. 8 schematically shows two panels according to an embodiment of the present invention in coupled condition, and FIGS. 9a-9c schematically show two alternative interconnected panels with first and second coupling parts according to the present invention.

DESCRIPTION OF THE INVENTION

Figure 1A:
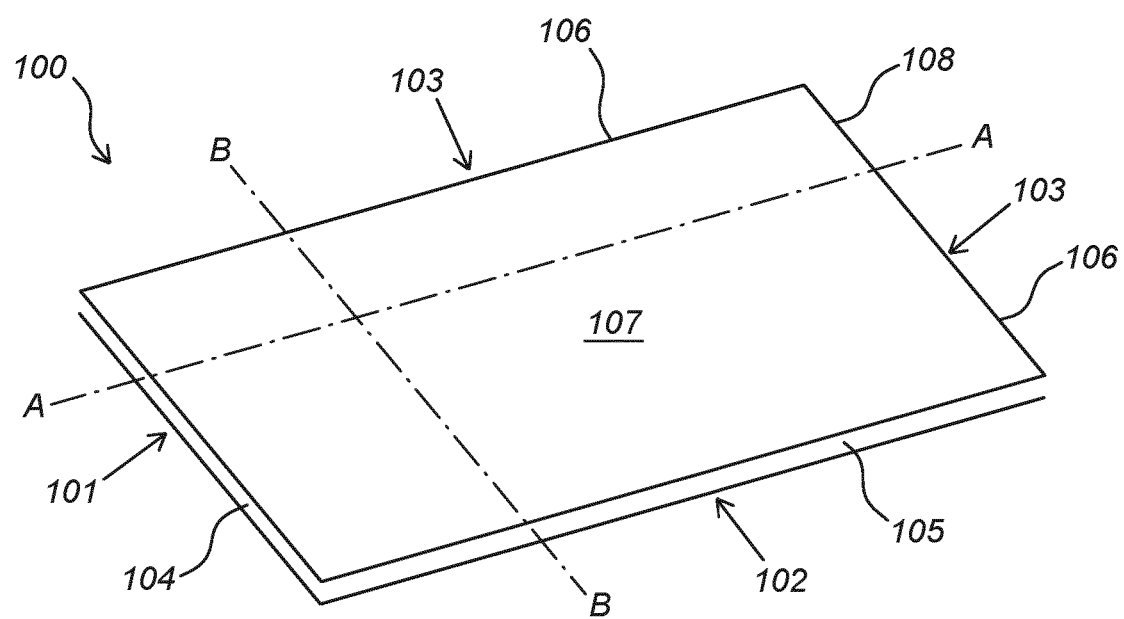
FIG. 1a shows a schematic representation of a multi-purpose panel for use in a multi-purpose panel system according to the invention.

FIG. 1a shows a schematic representation of a multi-purpose decorative panel (100) for use in a multi-purpose panel system (110) according to the invention. The figure shows a panel (100) comprising a first pair of opposing edges consisting of a first edge (103) and an opposite third edge (101) and a second pair of opposing edges consisting of a second edge (102) and an(other) opposing third edge (101). The first, second and third edges (103, 102, 101) are respectively provided with first, second and third coupling profiles (106, 105, 104). The first coupling profile (106) and the third coupling profile (104) are configured such that two of such panels (100) can be coupled to each other at the first and third edges (103, 102) by means of a turning movement. Moreover, the second coupling profile (105) and the third coupling profile (104) are configured such that the two of such panels (100) can be coupled to each other at the second and third edges (102, 101) by means of a fold-down movement and/or a vertical movement (lowering movement). The proportional relationship between the width and the length of the panel (100) may be chosen at will. FIG. 1a shows only one of the many possibilities wherein the panel has a upper side (107) with a rectangular contour (108). It is however also possible that the width and the length of the panel (100) are the same such that the panel (100) has an upper side (107) with a square contour.

Figure 1B:
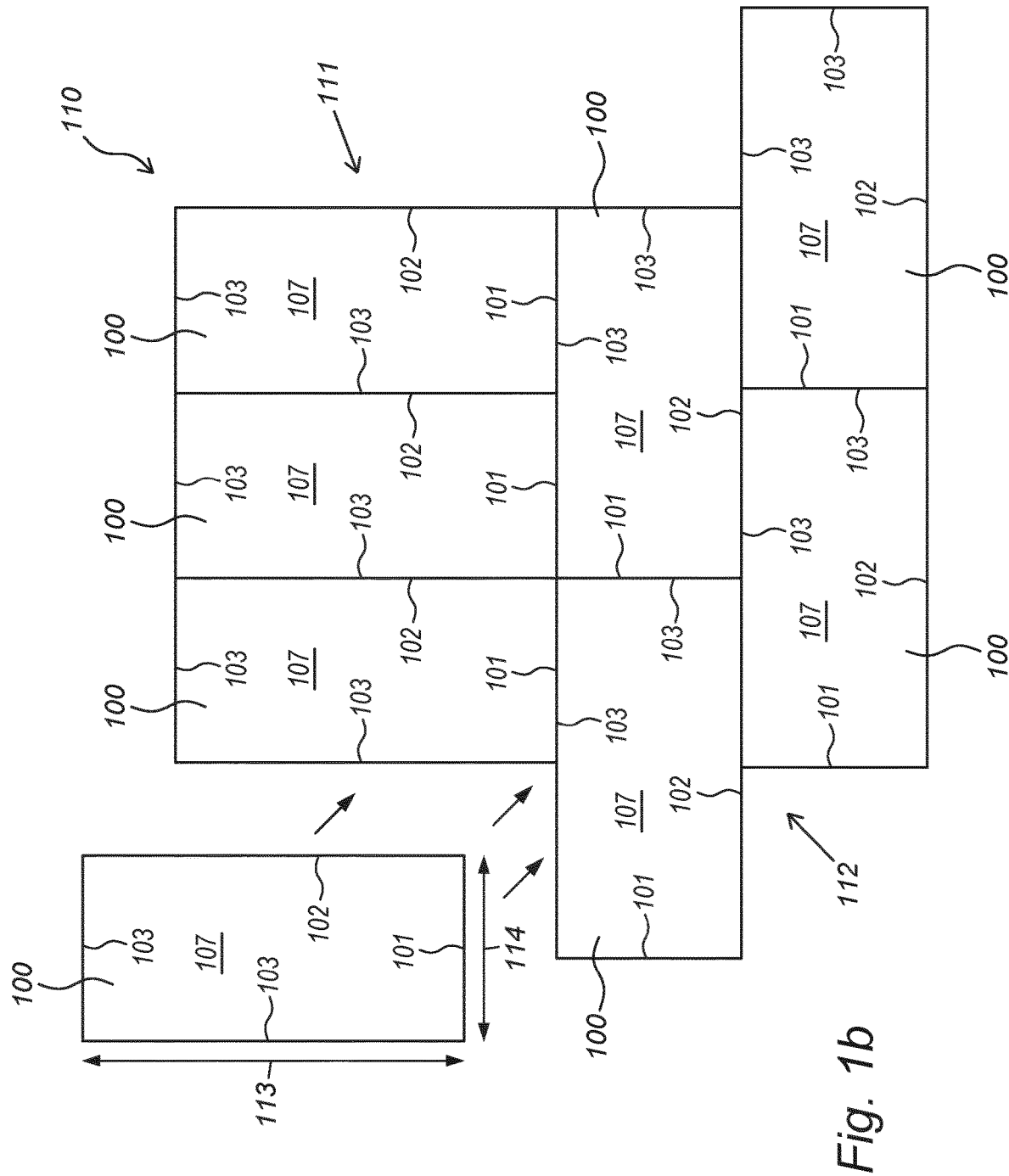

FIG. 1b shows a schematic representation of a multi-purpose panel system (110) comprising a plurality of multi-purpose panels (100) as shown in FIG. 1a. Although each of the panels (100) are equivalent, having a first pair of opposing edges consisting of a first edge (103) and an opposite third edge (101) and a second pair of opposing edges consisting of a second edge (102) and an opposing third edge (101), the panels (100) may, due to the compatibility of the coupling profile of the third edge (101) with the coupling profile of both the first and the second edge (103, 102), be joined in different ways, resulting in differential panel patterns (111, 112) within one multi-purpose panel system (110). In the depicted multi-purpose panel system (110) wherein the individual panels (110) have an upper side (107) with a rectangular contour (108), the panels (100) each have a long side (113) and a short side (114). The different panel patterns (111, 112) are hereby created by coupling a first panel pattern (111) of interconnected panels (100), having their long side (113) connected to the long side (113) of an adjacent panel (100), to a second panel pattern (112) of interconnected panels (100), having their long side (113) connected to the long side (113) of an adjacent panel (100) and their short side (114) connected to the short side (114) of another adjacent panel (100). The first and second panel patterns (111, 112) are hereby rotated to each other such that the long sides (113) of the panels (100) of the first panel pattern (111) lie at a 90 degree angle relative to the long sides (113) of the panels (100) of the second panel pattern (112). This coupling between the different panel patterns (111, 112) is made possible through the connection of the short sides (114) of the panels (100) of the first panel pattern (111) to the long sides (113) of the panels (100) of the second panel pattern (112). Installation of the panel system (110) can be realized by angling down the first edge (101) of a panel (100) to be installed with respect to a third edge (103) of an already installed panel (100), which will commonly mutually lock said panels (100) in both vertical and horizontal direction. During this angling or turning movement of the panel (100) to be installed with respect to the already installed panel (100), the second edge (102) of the panel (100) to be installed will be connected (simultaneously) to the third edge (101) of another already installed panel (100), which is typically realized by lowering or folding down the panel (100) to be installed with respect to the other already installed panel (100) during which the second edge (102) of the panel (100) to be installed and the third edge (101) of the other already installed panel (100) will be scissored (zipped) into each other. This results in a locking of the panel (100) to be installed with respect to the other already installed panel (100) both in horizontal and vertical direction.

Figure 2A:
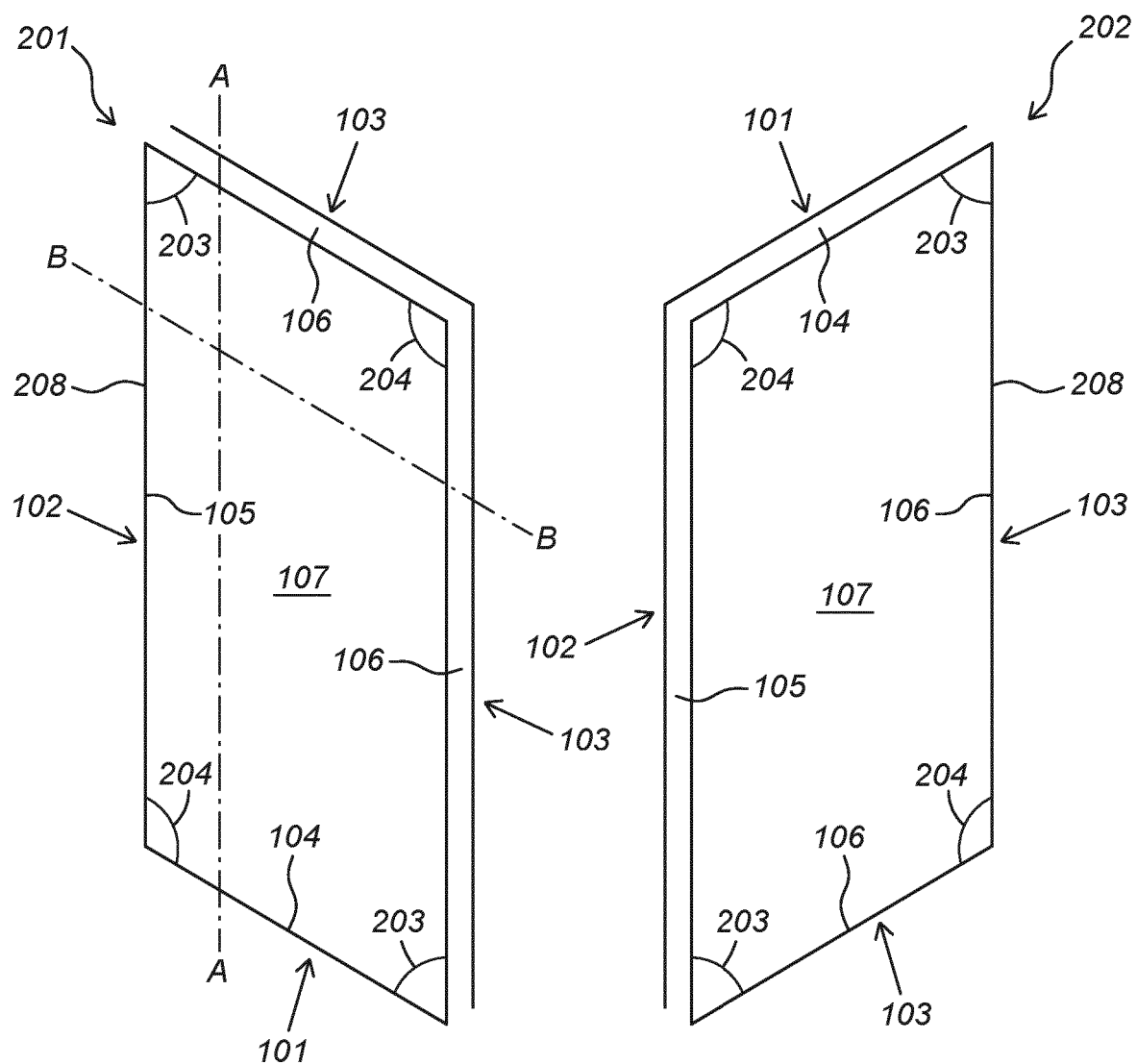
FIG. 2a shows a schematic representation of two different types of multi-purpose panels for use in another embodiment of a multi-purpose panel system according to the invention.

FIG. 2a shows a schematic representation of two different types of multi-purpose panels (201, 202) for use in another embodiment of a multi-purpose panel system (200) according to the invention. Just as the multi-purpose panel (100) shown in FIG. 1a, each of these panels (201, 202) comprises a first pair of opposing edges consisting of a first edge (103) and an opposite third edge (101) and a second pair of opposing edges consisting of a second edge (102) and an opposing third edge (101). Again, the first, second and third edges (103, 102, 101) are respectively provided with first, second and third coupling profiles (106, 105, 104), wherein the first coupling profile (106) and the third coupling profile (104) are configured such that two panels (201, 202) can be coupled to each other at the first and third edges (103, 101) by means of a turning movement, and the second coupling profile (105) and the third coupling profile (104) are configured such that the two panels (201, 202) can be coupled to each other at the second and third edges (102, 101) by means of a fold-down movement and/or a vertical movement. This time however, there are two different types of panels (201, 202), wherein the coupling profiles (105, 104) of one pair of opposing edges (102, 101) on the first type of panel (201) are arranged in a mirror-inverted manner relative to the coupling profiles (105, 106) of the corresponding pair of opposing edges (102, 101) on the second type of panel (202). Note that the depicted edge pairs of the different types of panels (201, 202) that are mirror-inverted are formed by second and third edges (102, 101). However it is likewise possible that the mirror-inverted edge pairs are formed by first and third edges (103, 101). Moreover, the multi-purpose panels (201, 202) for use in this multi-purpose panel system (200) have an upper side (107) with a parallelogram-shaped contour (208). Two adjoining edges (103, 102, 101) of these panels (201, 202) hereto either enclose an acute angle (203) or a obtuse angle (204). In this specific embodiment, the first and second edge (103, 102) respectively the third edges (101) enclose an obtuse angle (204) of the same size, while the first and the third edge (103, 101) respectively the second and third edge (102, 101) enclose an acute angle (203) of the same size. The difference in panel configuration and parallelogram-shaped contour (208) of their upper side (107) allows these panels (201, 202) to form a chevron pattern (205) in a joined state.

Figure 2B:
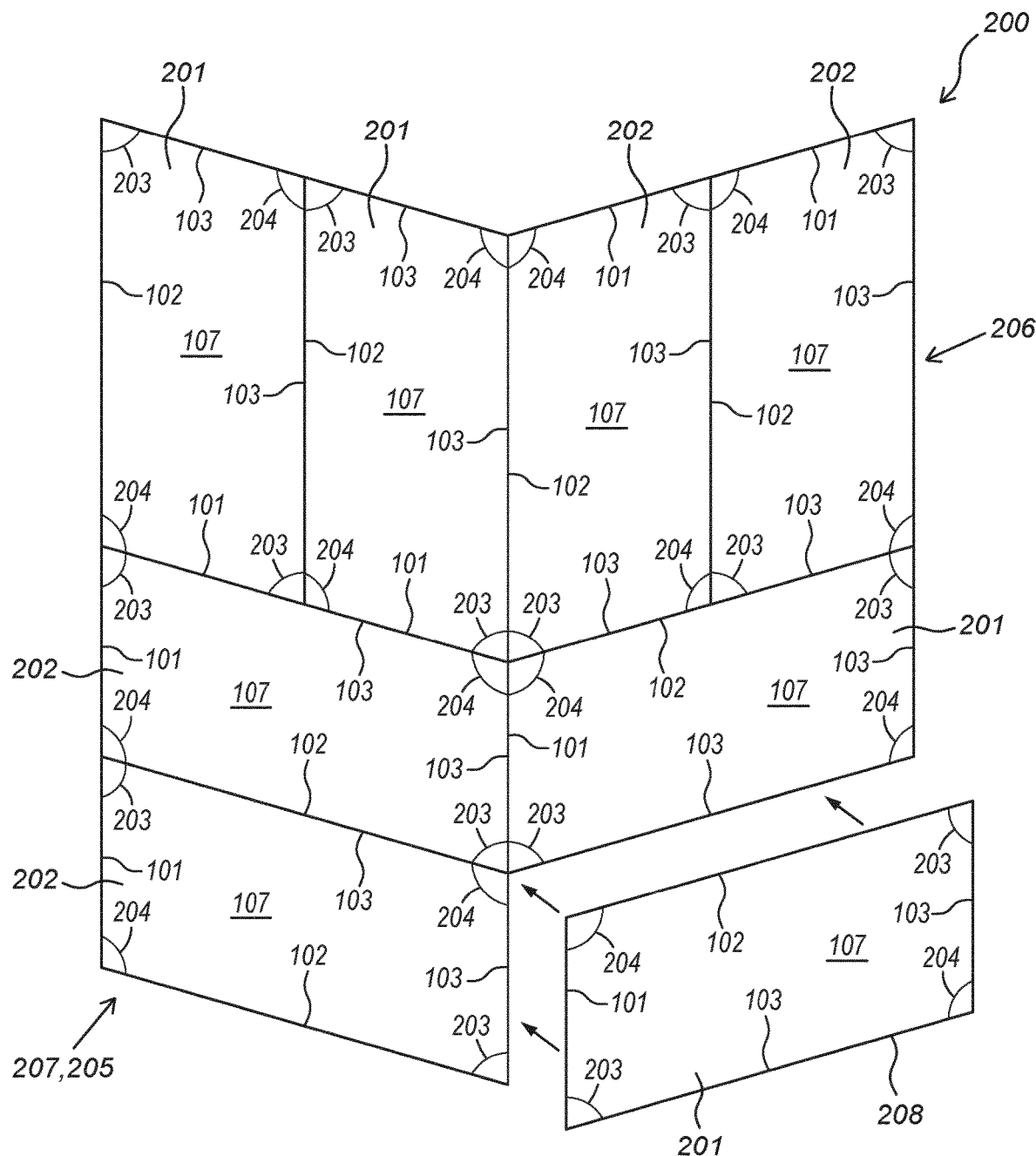

FIG. 2b shows a schematic representation of a multi-purpose panel system (200) comprising a plurality of multi-purpose panels (201, 202) as shown in FIG. 2a. As already discussed previously, the multi-purpose panels (201, 202) forming part of this multi-purpose panel system (200) come in two different (mirrored) types/configurations. While the difference in panel configuration and parallelogram-shape of their top surface (107) allows these panels (201, 202) to form a chevron pattern (205) in a joined state, having a first pair of opposing edges consisting of a first edge (103) and an opposite third edge (101) and a second pair of opposing edges consisting of a second edge (102) and an opposing third edge (101), wherein the coupling profile (104) of the third edge (101) is compatible with the coupling profile (106, 105) of both the first and the second edge (103, 102), allows the panels (201, 202) to be joined in different ways as well, resulting in differential panel patterns (206, 207) within one interconnected multi-purpose panel system (200). Like in the multi-purpose panel system (110) shown in FIG. 1b, the different panel patterns (206, 207) are created by coupling a first panel pattern (206) of interconnected panels (201, 202) to a second panel pattern (207) of interconnected panels (201, 202). Within these separate panel patterns (206, 207), each panel (201, 202) has each of its pairs of opposing edges (101, 103; 102, 103) connected to the edges (101, 102, 103) of adjacent panels (201, 202) being part of a corresponding pair of opposing edges (101, 103; 102, 103) of said adjacent panels (201, 202). The coupling of the first and second panel patterns (206, 207) is however realized through the connection of a panel (201, 202) of first panel pattern (206) with an edge (101, 103) forming part of one pair of opposing edges (101, 103) to a panel (201, 202) of second panel pattern (207) with an edge (102, 103) forming part of the other, non-corresponding pair of opposing edges (102, 103). The result is an interconnected, multi-purpose panel system (200) comprising two different panel patterns (206, 207) that are rotated 90 degrees relative to each other. Installation of the panel system (200) shown in FIG. 2b is typically analogous to the installation of the panel system (110) shown in FIG. 1b.

Figure 3A:
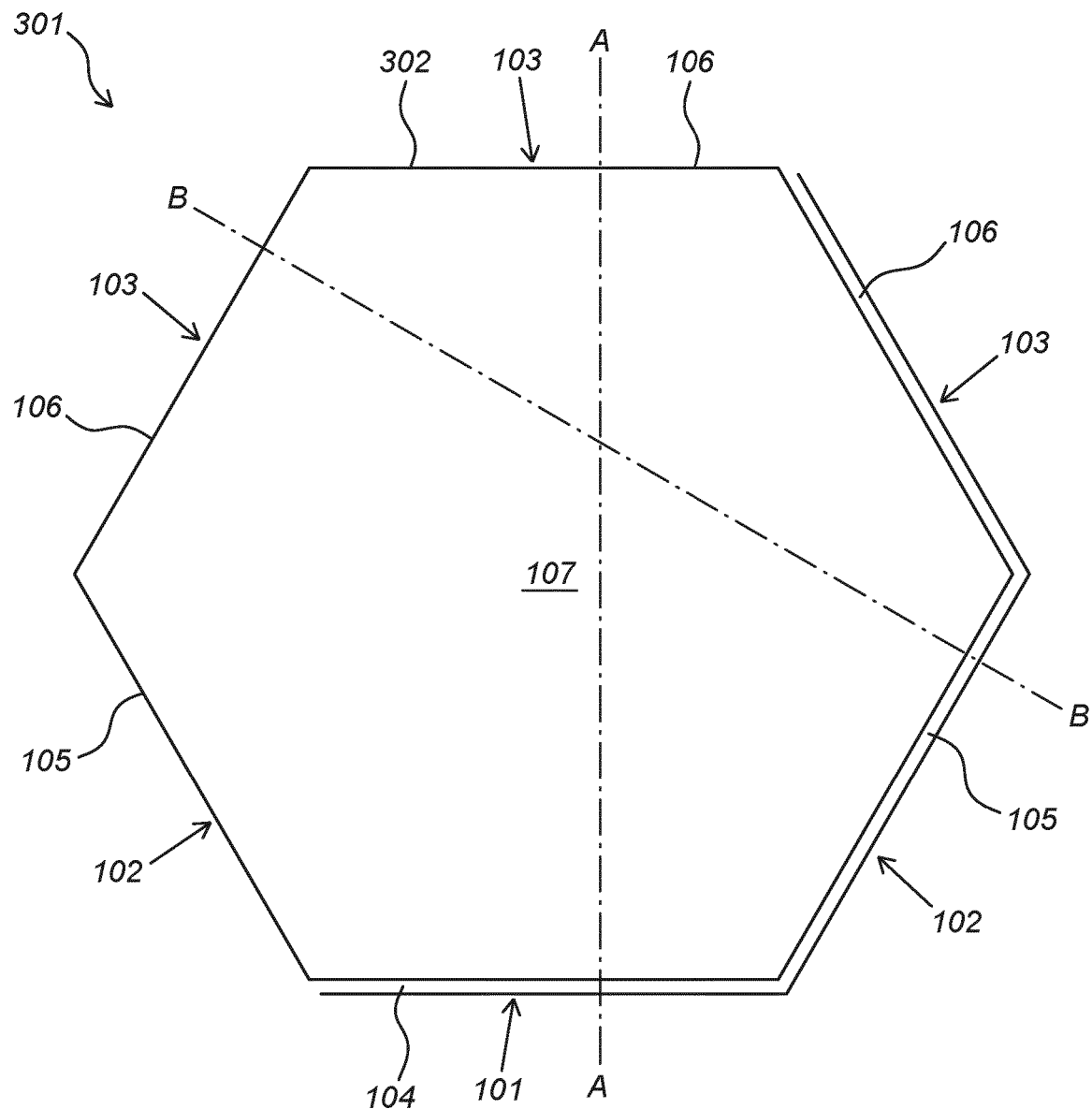
FIG. 3a shows a schematic representation of a multi-purpose panel for use in yet another embodiment of a multi-purpose panel system according to the invention.

FIG. 3a shows a schematic representation of a multi-purpose panel (301) for use in yet another embodiment of a multi-purpose panel system (300) according to the invention. Other than the multi-purpose panels (100, 201, 202) shown in FIGS. 1a and 2a, each of these panels (301) comprises three pairs of opposing edges and has an upper side (107) with a regular hexagon-shaped contour (302). The first pair of opposing edges consists of a first edge (103) and an opposite third edge (101). The second and third pair of opposing edges consist of a second edge (102) and an opposing third edge (101). The first, second and third edges (103, 102, 101) are hereby positioned such that the third edges (101) lie directly adjacent to each other and the second edges (102) lie on both edges adjacent to the first edge (103). The second edges (102), as a consequence, do not lie adjacent to each other. The commonality between these multi-purpose panels (301) and the multi-purpose panels (100, 201, 202) shown in FIGS. 1a and 2a is however that the first, second and third edges (103, 102, 101) are respectively provided with first, second and third coupling profiles (106, 105, 104), wherein the first coupling profile (106) and the third coupling profile (104) are configured such that two panels (301) can be coupled to each other at the first and third edges (101, 103) by means of a turning movement, and the second coupling profile (105) and the third coupling profile (104) are configured such that the two panels (301) can be coupled to each other at the second and third edges (102, 101) by means of a fold-down movement and/or a vertical movement.

Figure 3B:
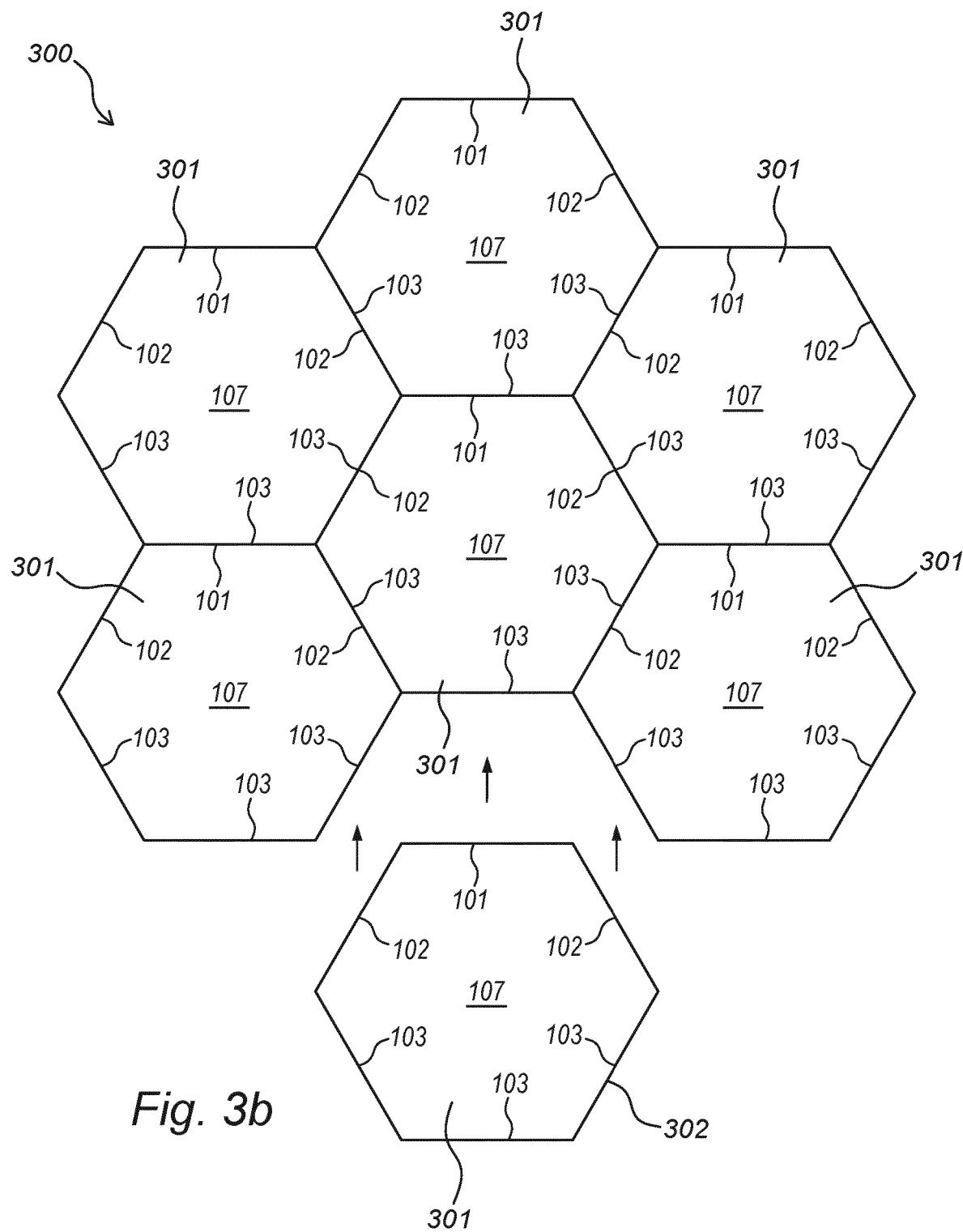

FIG. 3b shows a schematic representation of a multi-purpose panel system (300) comprising a plurality of multi-purpose panels (301) as shown in FIG. 3a. In the depicted panel formation, the panels (301) are all identically oriented. Installation of the panel system (300) can be realized in a similar fashion as the panel systems (110, 200) of FIGS. 1b and 2b. By angling down the first edge (103) of a panel (301) to be installed with respect to a third edge (103) of an already installed panel (301), said panels (301) will commonly mutually lock in both vertical and horizontal direction. During this angling or turning movement of the panel (301) to be installed with respect to the already installed panel (301), one or more second edges (102) of the panel (300) to be installed will be connected (simultaneously) to a third edge (103) of one or more other already installed, adjacent panels (301), which is typically realized by lowering or folding down the panel (301) to be installed with respect to the other already installed panel(s) (301) during which said second edge(s) (102) of the panel (301) to be installed and the third edge(s) (103) of the other already installed panel(s) (301) will be scissored (zipped) into each other. This results in a locking of the panel (301) to be installed with respect to the other already installed panel(s) (301) both in horizontal and vertical direction.

Figure 4A:
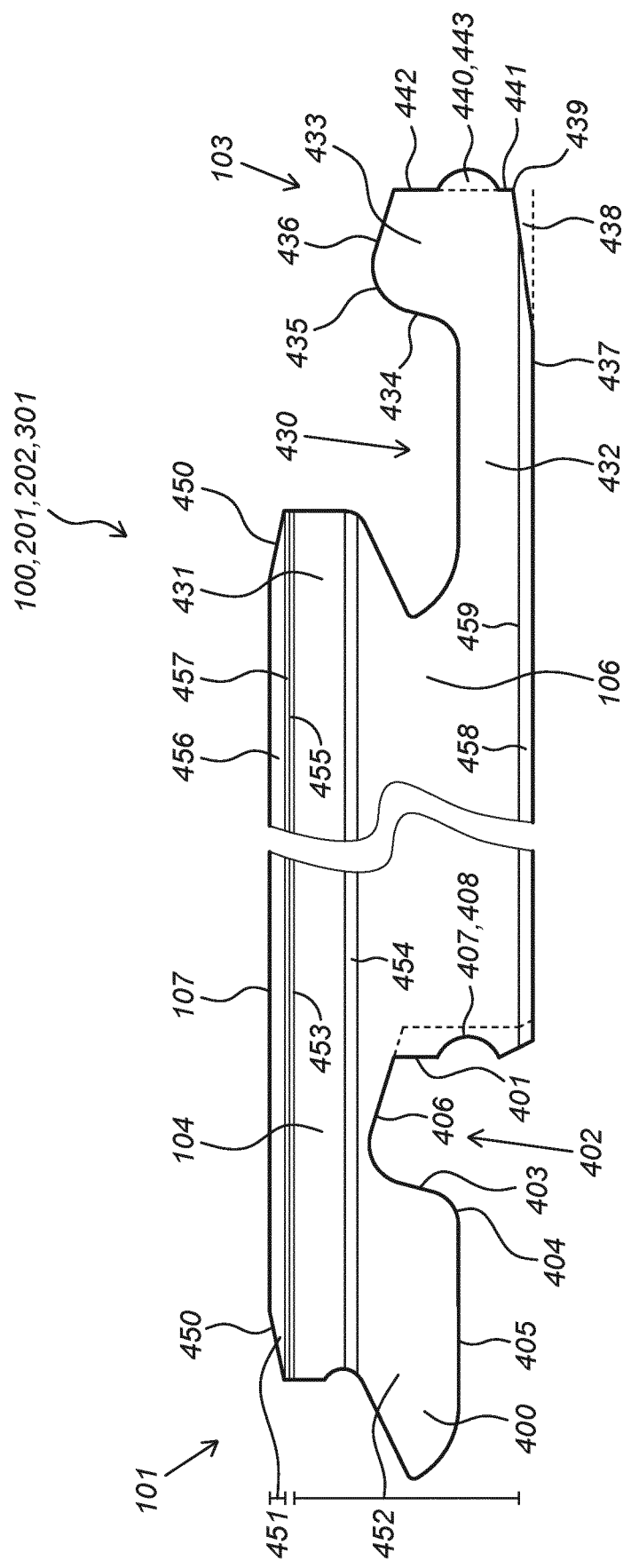

FIG. 4a shows a cross-section along line A-A of a multi-purpose panel (100, 201, 202, 301) as shown in FIG. 1a, 2a or 3a. In the figure, the third edge (101) and an opposing first edge (103) of the panel (100, 201, 202, 301) are visible, having a third coupling profile (104) and a first coupling profile (106) respectively. The third coupling profile (104) comprises a sideward tongue (400) extending in a direction substantially parallel to the upper side (107) of the panel (100, 201, 202, 301), at least one third downward flank (401) lying at a distance from the sideward tongue (400), and a third downward recess (402) formed between the sideward tongue (400) and the third downward flank (401). The proximal side (403) of the sideward tongue (400) of the third coupling profile (104), facing the third downward recess (402), is hereby downwardly inclined in a direction away from the third downward flank (401). It is however likewise possible that the proximal side (403) of the sideward tongue (400) is downwardly inclined in a direction towards the third downward flank (401). A third transition zone (404) can be defined between the proximal side (403) of the sideward tongue (400) of the third coupling profile (104) and a lower side (405) of the sideward tongue (400) of the third coupling profile (104), which third transition zone (404) is in this instance curved. The upper side (406) of the third downward recess (402) is in the depicted panel (100, 201, 202, 301) inclined downwardly towards the third downward flank (401). The third coupling profile (104) may furthermore comprise a third locking element (407) which may, in a coupled position, co-act with a first locking element (440) of a third coupling profile (106) of an adjacent panel (100, 201, 202, 301). This third locking element (407) may be provided at the third downward flank (401) of the third coupling profile (104). In the presently depicted panel (100, 201, 202, 301), the third locking element (407) comprises at least one third locking groove (408). As indicated by the dashed lines, the first locking element (440) may be omitted and/or the third locking element (407) may be omitted. The first coupling profile (106) comprises a first recess (430) configured for accommodating at least a part of the sideward tongue (400) of the third coupling profile (104) of a further panel (100, 201, 202, 301), said first recess (430) being defined by an upper lip (431) and a lower lip (432), wherein said lower lip (432) is provided with a (first) upward locking element (433), which may also be referred to as first upward tongue in this example. The proximal side (434) of the upward locking element (433) of the first coupling profile (106), facing the first recess (430), is upwardly inclined in a direction away from the upper lip (431). It may however be possible as an alternative that the proximal side (434) of the upward locking element (433) is upwardly inclined in a direction towards the upper lip (431). A first transition zone (435) can be defined between the proximal side (434) of the upward locking element (433) and an upper side (436) of the upward locking element (433), which first transition zone (435) is in this instance also curved to follow the curved third transition zone (404). The upper side (436) of the upward locking element (433) is in the depicted panel (100, 201, 202, 301) inclined downwardly in a direction facing way from the upper lip (431) of the first coupling profile (106). At the lower side (437) of the lower lip (432) of the first coupling profile (106), a recess (438) is present, which extends up to the distal end (439) of the lower lip (432). This recess (438) allows bending of the lower lip (432) in a downward direction. As already mentioned, the first coupling profile (106) may further comprise a first locking element (440) that may co-act with the third locking element (407) of the third coupling profile (104) of an adjacent panel (100, 201, 202, 301) to establish a vertical lock between the coupled panels (100, 201, 202, 301). The first locking element (440) may hereto provided at a distal side (441) of the lower lip (432) facing away from the first recess (430) and/or at a distal side (442) of the upward locking element (433) facing away from the first recess (430). The first locking element (440) may, as depicted here, specifically be positioned at a distance both from a lower side (437) of the lower lip (432) and an upper side (436) of the upward locking element (433). In the presently depicted panel, the first locking element (440) comprises at least one outward bulge (443) which outward bulge (443) is adapted to be at least partially received in the third locking groove (408) or a second locking groove (423) of an adjacent coupled panel (100, 201, 202, 301) for the purpose of realizing a (vertically) locked coupling. The core (452) is provided with at least one reinforcing layer (454), such as a glass fibre layer (cloth), incorporated (embedded), in the core (452). More in particular, the core comprises at least one polymer, and at least one plasticizer composition as defined in the appended claims.

The core may comprises further additives, such as calcium carbonate and/or cellulose based particles dispersed in said polymer (matrix); and, in this embodiment, at least one reinforcement layer (454) embedded in said core. The shown core may be considered as a single layer, although a part is situated above the reinforcement layer (454) and a part is situated below the reinforcement layer (454), wherein both parts are mutually (integrally) connected by composite material present in the pores of the reinforcement layer. Examples of detailed compositions and additives have been described in the above already in a comprehensive manner.

Figure 4B:
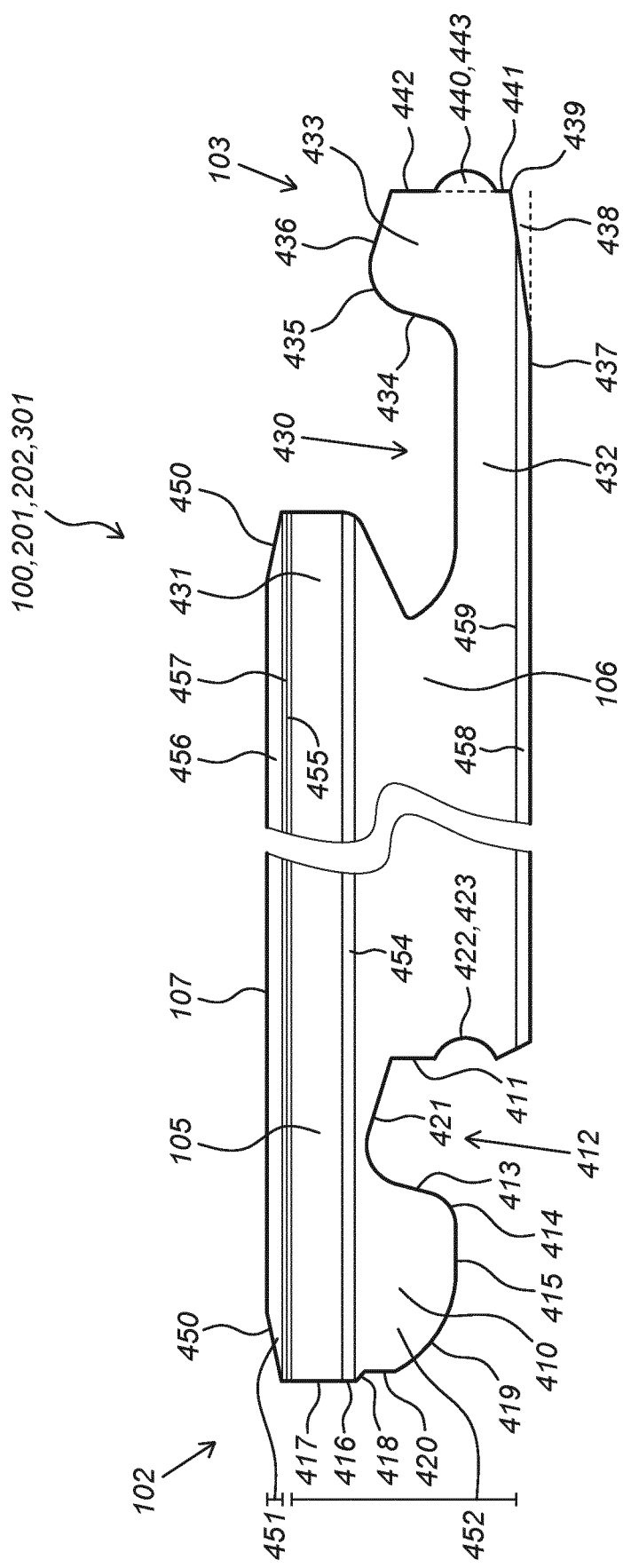

FIG. 4b shows a cross-section along line B-B of a multi-purpose panel (100, 201, 202, 301) as shown in FIG. 1a, 2a or 3a. In the figure, the second edge (102) and another opposing first edge (103) of the panel (100, 201, 202, 301) are visible, having a second coupling profile (105) and a first coupling profile (106) respectively. Where the first coupling profile (106) matches the first coupling (106) profile provided on the adjacent first edge (103) of the panel (100, 201, 202, 301), which characteristics are given above in the description of the cross-section along line A-A of the multi-purpose panel (100, 201, 202, 301), the second coupling profile (105) comprises a downward tongue (410) extending in a direction substantially perpendicular to the upper side (107) of the panel (100, 201, 202, 301), at least one second downward flank (411) lying at a distance from the downward tongue (410), and a second downward recess (412) formed between the downward tongue (410) and the second downward flank (411). The proximal side (413) of the downward tongue (410) of the second coupling profile (105), facing the second downward recess (412), is hereby downwardly inclined in a direction away from the second downward flank (411). It is however also possible that the proximal side (413) of the downward tongue (410) is downwardly inclined in a direction towards the second downward flank (411). A second transition zone (414) can be defined between the proximal side (413) of the downward tongue (410) of the second coupling profile (105) and a lower side (415) of the downward tongue (410) of the second coupling profile (105), which second transition zone (414) is in this instance curved. A distal side (416) of the downward tongue (410), facing away from the second downward recess (412), comprises at least a vertical upper wall part (417) adjacent to the upper side (107) of the panel (100, 201, 202, 301), and, adjacent to and located below said vertical upper wall part (417), an angled wall part (418) that angles inward toward a chamfered and/or curved lower wall part (419) of said distal side (416) of the downward tongue (410). An intermediate vertical wall part (420) may hereby be present between the angled wall part (418) and the chamfered and/or curved lower wall part (419). The lower wall part (419) of distal side (416) of the downward tongue (410) may moreover be connected to the lower side (415) of the downward tongue (410). The upper side (421) of the second downward recess (412) is in the depicted panel (100, 201, 202, 301) inclined downwardly towards the second downward flank (411). The second coupling profile (105) may furthermore comprise at least one second locking element (422) which may, in a coupled position, co-act with a first locking element (440) of a first coupling profile (106) of an adjacent panel (100, 201, 202, 301) to establish a vertical lock between the panels (100, 201, 202, 301). The second locking element (422) may hereto be provided at the second downward flank (411) of the second coupling profile (105). In the presently depicted panel (100, 201, 202, 301), the second locking element (422) comprises at least one second locking groove (423) adapted to at least partially receive the outward bulge (443) of the first locking element (440) of an adjacent coupled panel (100, 201, 202, 301) for the purpose of realizing a (vertically) locked coupling.

The coupling profiles (104, 105, 106) of each of the multi-purpose panels (100, 201, 202, 301) shown in FIGS. 4a and 4b are provided with chamfers (bevels) (450) at or near the upper side (107) of the panels (100, 201, 202, 301). The panels (100, 201, 202, 301) comprise an upper substrate (451) affixed to an upper side (453) of a core (452) to which the third, second and first coupling profiles (104, 105, 106) are integrally connected. The at least one reinforcing layer (454), such as a glass fibre layer (cloth), as embedded in the core (452), is visualized again. Both FIG. 4a and FIG. 4b shows that this reinforcing layer (454) is present only in one of two complementary coupling profiles. The upper substrate (451) comprises a decorative layer (455), an abrasion resistant wear layer (456) covering said decorative layer (455) and a transparent finishing layer (457) situated in between the decorative layer (455) and the wear layer (456). The panels (100, 201, 202, 301) moreover comprise a backing layer (458) affixed to a bottom side (459) of the core (452).

Figure 5C:
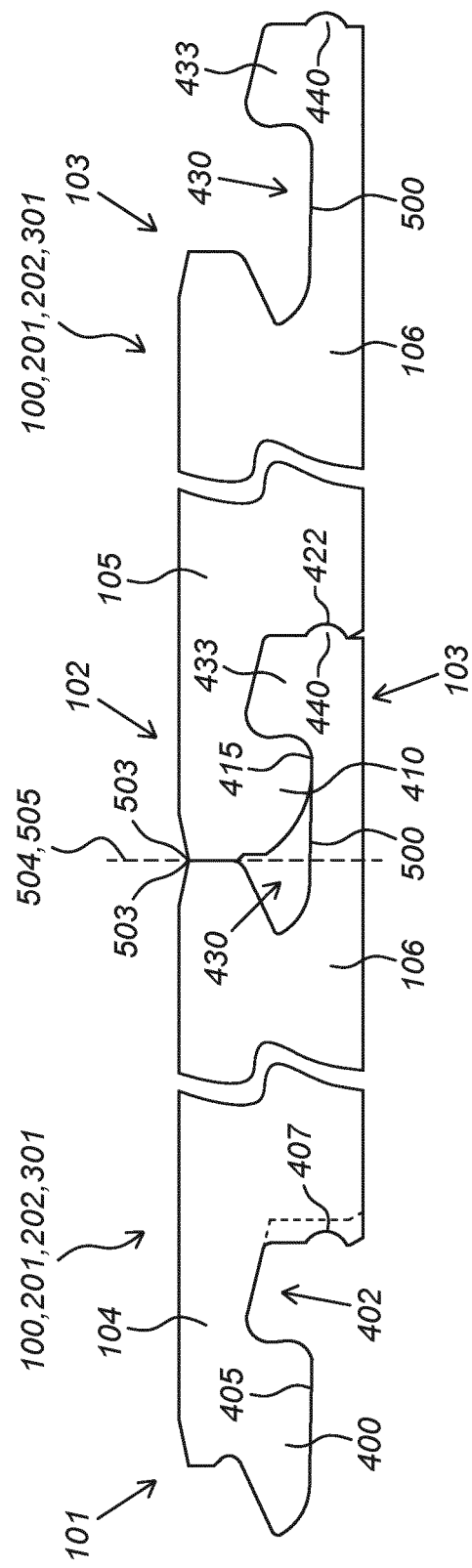

FIGS. 5a-5c show a cross-section of two multi-purpose panels (100, 201, 202, 301) as shown in FIG. 1a, 2a or 3a in a third, second and first coupled condition respectively. In these FIGS. it can be seen that in coupled condition, at least a part of the sideward tongue (400) of the third coupling profile (104) of a panel (100, 201, 202, 301) is inserted into the first recess (430) of the first coupling profile (106) of an adjacent panel (100, 201, 202, 301), and at least a part of the first upward locking element (433) of the first coupling profile (106) is inserted into the third downward recess (402) of the third coupling profile (104). To establish a fixation in the mutual position of the third coupling profile (104) and the first coupling profile (106), a lower side (405) of the sideward tongue (400) of the third coupling profile (104) may hereby be supported by a lower surface (500) of the first recess (430) of the first coupling profile (106). The third edge (101) and the first edge (103), in coupled condition, define a third closing surface (501) defined as a third vertical plane (502) through the upper edges (503) of the coupled panels (100, 201, 202, 301). Each of the sideward tongue (400) and the first recess (430) hereby extends through said third vertical plane (502). In the shown embodiments, the third and first coupling profiles (104, 106) respectively comprise a third and first locking element (407, 440). The third and first locking element (407, 440) are hereby positioned such that the third locking element (407) is facing and co-acting with the first locking element (440) of the first coupling profile (106) to realise a vertical locking effect. As addressed above and indicated by the dashed line(s), the first and/or third locking element may be omitted. In case merely the third locking element (407) is omitted, while the first locking element (440) is applied, in coupled condition of two panels, the third downward flank of a first panel is typically positioned at a distance from the distant side of the first upward locking element (433) of a second panel, which facilitates coupling of both profiles.

FIGS. 5a-5c moreover show that in coupled condition, at least a part of the second downward tongue (410) of the second coupling profile (105) is inserted in the first recess (430) of the first coupling profile (106), and at least a part of the upward locking element (433) of the first coupling profile (106) is inserted in the second downward recess (412) of the second coupling profile (105). To establish a fixation in the mutual position of the second coupling profile (105) and the first coupling profile (106), a lower side (415) of the downward tongue (410) of the second coupling profile (105) may hereby be supported by a lower surface (500) of the first recess (430) of the first coupling profile (106). The second edge (102) and the first edge (103), in coupled condition, define a second closing surface (504) defining a second vertical plane (505) through the upper edges (503) of the coupled panels (100, 201, 202, 301). The downward tongue (410) is hereby positioned at one side of said second vertical plane (505), while the first recess (430) extends through said second vertical plane (505). In the shown embodiments, the second coupling profile (105) moreover comprises a second locking element (422). Said second locking element (422) is facing and co-acting with the first locking element (440) of the first coupling profile (106) to realise a vertical locking effect.

Figure 6A:
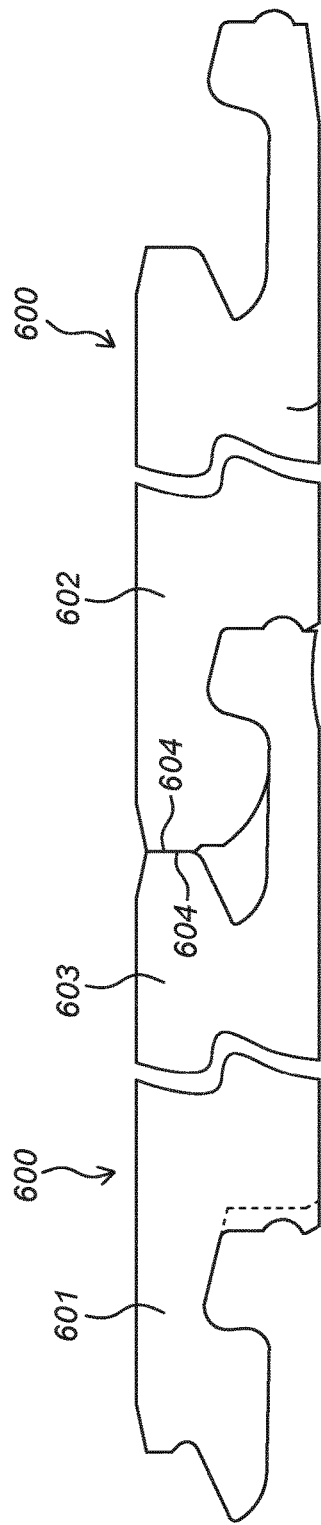
FIGS. 6a-6c show a cross-section of two multi-purpose panels with alternative coupling profiles in a first, second and third coupled condition respectively.
Figure 6B:
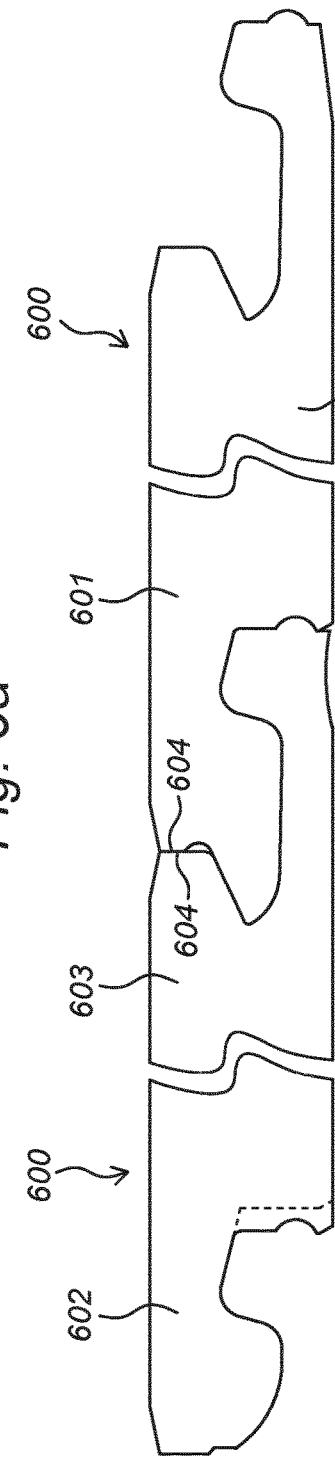
Figure 6C:
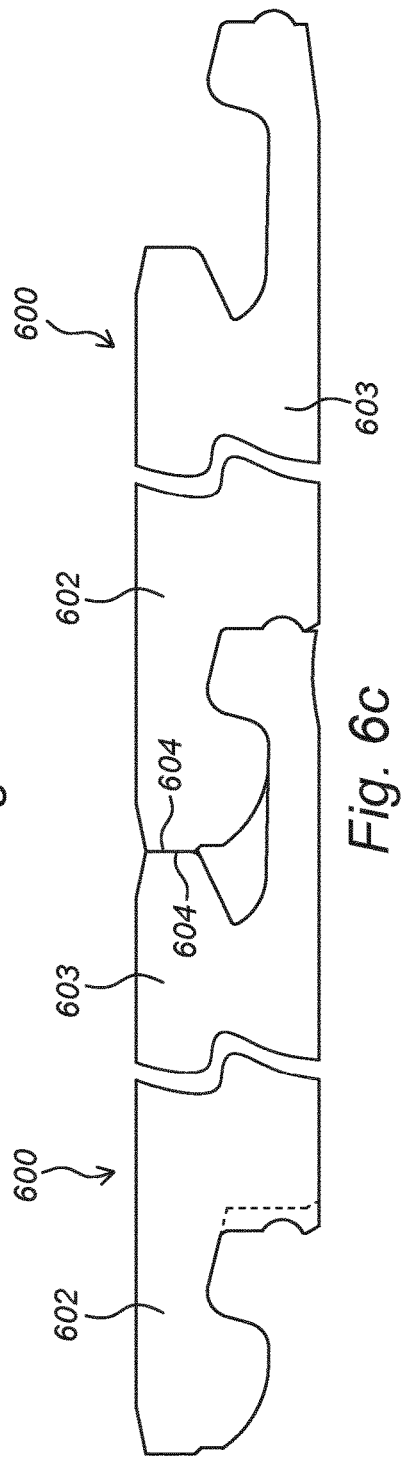

FIGS. 6a-6c show a cross-section of two multi-purpose panels (600) with alternative coupling profiles (601, 602, 603) in a third, second and first coupled condition respectively. Wherein the coupling profiles (104, 105, 106) of the panels (100, 201, 202, 301) shown in FIGS. 5a-5c are configured such that in a coupled condition, (substantially) no pretension exists between the coupling profiles (104, 105, 106), the coupling profiles (601, 602, 603) of the panels (600) shown in FIGS. 6a-6c are configured such that in coupled condition a pretension is existing, which forces the respective panels (600) at their respective edges (604) towards each other. In the shown embodiments of the coupling profiles (601, 602, 603), the pretension is the result of a (local) deformation of the coupling profiles (601, 602, 603).

Figure 7C:
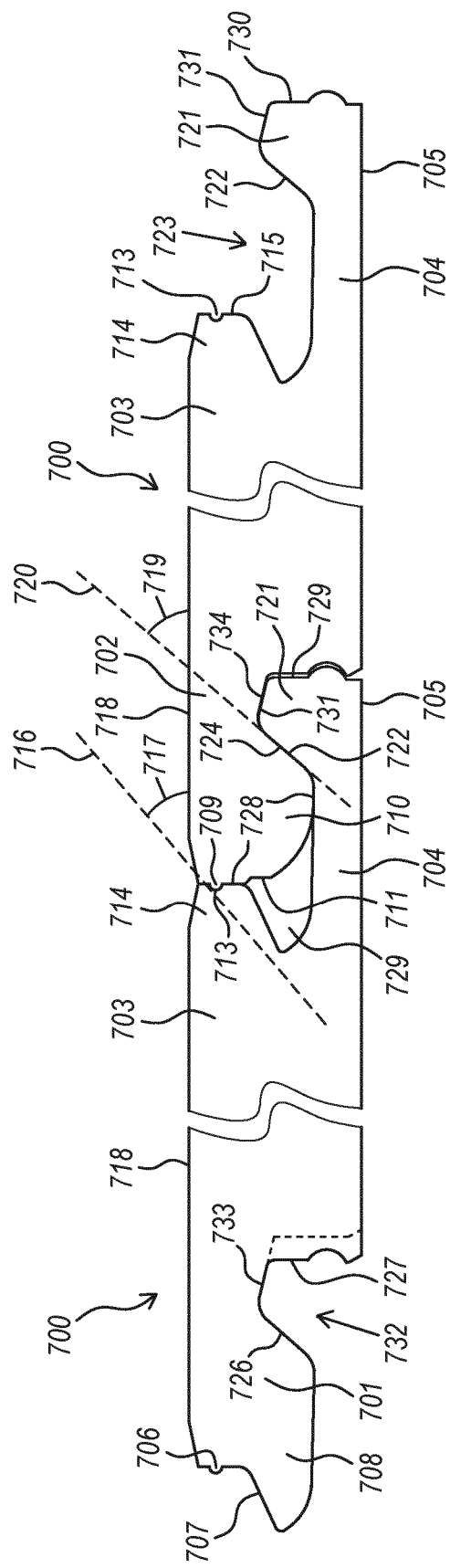

FIGS. 7a-7c show a cross-section of two multi-purpose panels (700) with further alternative coupling profiles (701, 702, 703) in a third, second and first coupled condition respectively. In this embodiment of the first coupling profile (703), no recess is present at the lower side (705) of the lower lip (704) thereof. In the depicted multi-purpose panels (700), the third coupling profile (701) moreover comprises another third locking element (706), provided at a distal side (707) of the third coupling profile (701), being located above at least a part of the sideward tongue (708). In addition, the second coupling profile (702) comprises another second locking element (709), provided at a distal side (711) of the downward tongue (710) facing away from the second downward recess (712). The first coupling profile (703) also comprises another, first, locking element (713), provided at a side (715) of the upper lip (714). In the coupled conditions shown in FIGS. 7a and 7b, the additional first locking element (713) faces the distal side (707) of the third coupling profile (701) of the adjacent panel (700), while in the coupled condition shown in FIG. 7c, the additional first locking element (713) faces the distal side (711) of the downward tongue (710) of the second coupling profile (702) of an adjacent panel (700). Further depicted in FIGS. 7a-7c is the co-action between the additional third or second locking element (706, 709) and the additional first locking element (713) for creating a vertical locking effect in coupled condition of two panels (700), defines a tangent T1 (716) which encloses an angle A1 (717) with a plane (718) defined by the panel (700), which angle A1 (717) is smaller than an angle A2 (719) enclosed by said plane (718) defined by the panel (700) and a tangent T2 (720) defined by a co-action between an inclined part of a proximal side (722) of the upward locking element (721) facing toward the first recess (723) and an inclined part of a proximal side (724) of the downward tongue (710) facing toward the second downward flank (725) respectively an inclined part of a proximal side (726) of the sideward tongue (708) facing toward the third downward flank (727).

In the embodiments of the coupling profiles (701, 702, 703) shown in FIGS. 7a-7c, the third coupling profile (701) and the first coupling profile (703) respectively the second coupling (702) and the first coupling profile (703) are configured such that in coupled condition a plurality of distant contact zones (728) are present, wherein in between each pair of adjacent contact zones (728) a space (729) remains. Specifically, FIGS. 7a and 7b show that the third downward flank (727) of the third coupling profile (701) and a distal side (730) of the upward locking element (721) and the lower lip (704) of the first coupling profile (703), facing the third downward flank (727), are positioned at a distance from each other. Additionally, the upper side (731) of the upward locking element (721) of the first coupling profile (703) is positioned at a distance from the upper side (733) of the third downward recess (732) of the third coupling profile (701). In FIG. 7c one can see that the second downward flank (725) of the second coupling profile (702) and a distal side (730) of the upward locking element (721) and the lower lip (704) of the first coupling profile (703), facing the second downward flank (725), are positioned at a distance from each other. In addition, the upper side (731) of the upward locking element (721) of the first coupling profile (703) is positioned at a distance from the upper side (734) of the second downward recess (712) of the second coupling profile (702).

In the embodiments according to FIGS. 5a-7c, the core material is composed from a material as defined in the appended claims.

Figure 8:
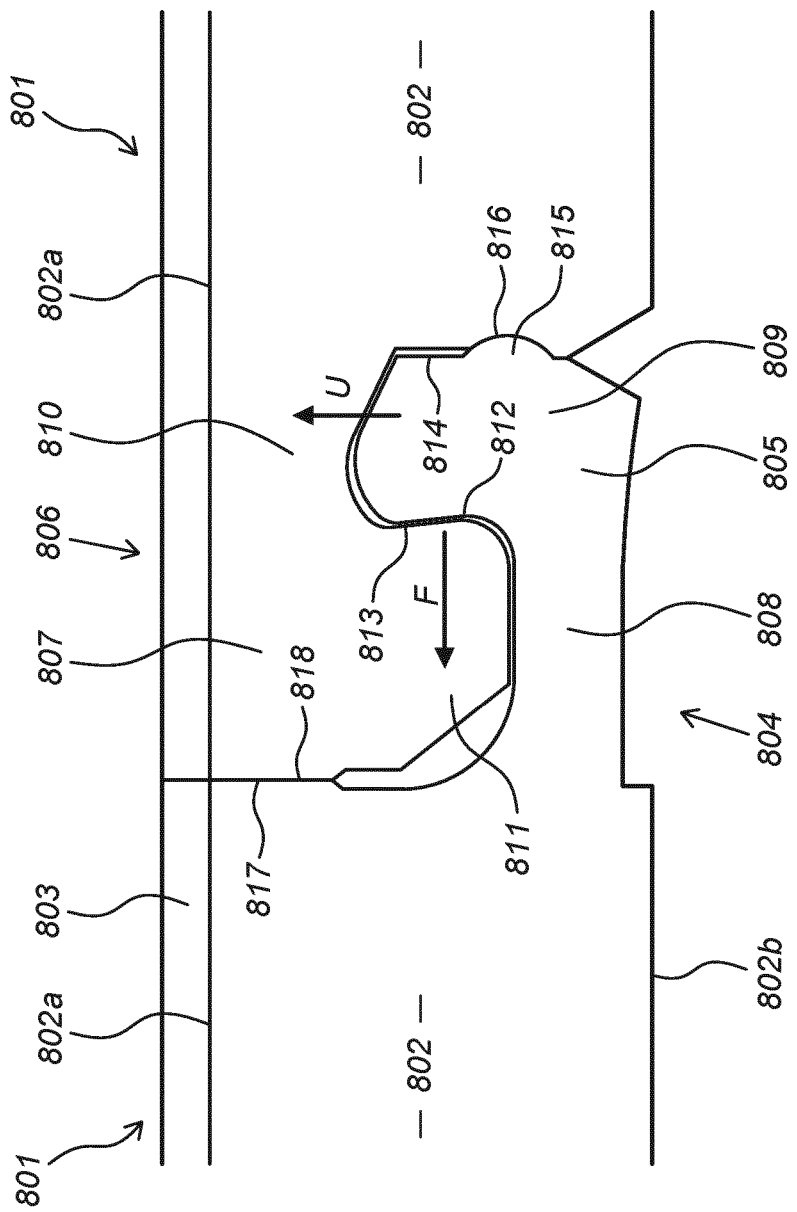

FIG. 8 schematically shows two panels (801) according to an embodiment of the present invention, in a coupled condition. The panels (801) comprise a core (802), with an upper side (802a) and a lower side (802b), and a decorative top structure (803) on top of the core (802). A third panel edge (804) of the panels (801) comprises a first coupling profile (805), and a second panel edge 80 (6) comprises a second coupling profile (807) for providing locking in horizontal and vertical direction.

In FIG. 8 the coupling profiles (805, 807) are shown schematically as hook-like profiles that grip behind each other. The first coupling profile (805) comprises a first bridge portion (808), which extends from the core (802) towards an upward locking element (809). The second coupling profile (807) comprises a second bridge portion (810), which extends from the core (802) towards a downward locking element (811). In coupled condition the upward and downward locking elements hook behind each other, providing locking in horizontal direction.

For vertical locking, the embodiment shown in FIG. 8 provides two options. Firstly, the inside (812) of the upward locking element (809), so the side of the upward locking element (9) directed towards the core (802), is angled towards the core (802), to create a so-called "closed groove locking". The same applies to the inside (813) of the downward locking element (811). During coupling, the locking elements (809, 811) and/or the bridge portions (808, 810) deform, to allow the elements (809, 811) to engage. Secondly, the outside (814) of the upward locking element (809), so the side of the upward locking element (809) directed away from the core, is provided with a locking bulge (815). The core (802) on the other panel edge is provided with a recess (816), to co-act with the locking bulge (815).

In FIG. 8, additional locking is provided by a force, exerted by the first coupling profile (805). This force is the result of a bended configuration of the first coupling profile (805) in coupled condition, the upward locking element (809) is forced downwards during coupling, and wishes to return upwardly (U). However, this movement is hindered by the shape and dimension of the coupling profiles (805, 807), in FIG. 8 among others due to the closed groove configuration. As a result, a force (F) is exerted, exerting a closing action on the panels and forcing the panels towards each other at the upper contact surfaces (817, 818). The upper contact surfaces (817, 818) are thus forced towards each other.

The specific shape and function of the coupling profiles (805, 807) is illustrational only, and can be interchanged with other known coupling profiles known in the art.

At the upper contact surfaces (817, 818) it is beneficial when a tight engagement or seal between the two panels (801) is achieved. Such tight engagement or seal prevents undesirable water ingress into the joint and helps to keep the panels (801) dry and clean. In order to improve the engagement or seal of the upper contact surfaces (817, 818), it is beneficial if at the location of the upper contact surfaces (817, 818) the material of the core (802) is relatively flexible. This flexibility can for instance be achieved by including an amount of plasticizer into the material of the core (802), at least at the location of the contact surfaces (817, 818). A composition of plasticizer which is particularly suitable to this end is a plasticizer composition including polyvinyl butyral, or PVB.

Additionally it is also beneficial when the coupling profiles (805, 807) can deform during coupling, for instance to allow closed groove coupling systems to engage. To that end, and to improve deformation during coupling, the material of the coupling profiles (805, 807) may include an amount of plasticizer, at least in the locking elements (809, 811) or the bridge portions (808, 810) of the coupling profiles (805, 807). A composition of plasticizer which is particularly suitable to this end is a plasticizer composition including polyvinyl butyral, or PVB. To this end, the coupling profiles (805, 807) may be made as part of the material layer or the core (802), or the coupling profiles (805, 807) may be made in one piece with the material layer or core (802), and are for instance milled into the material layer or core (802).

Figure 9A:
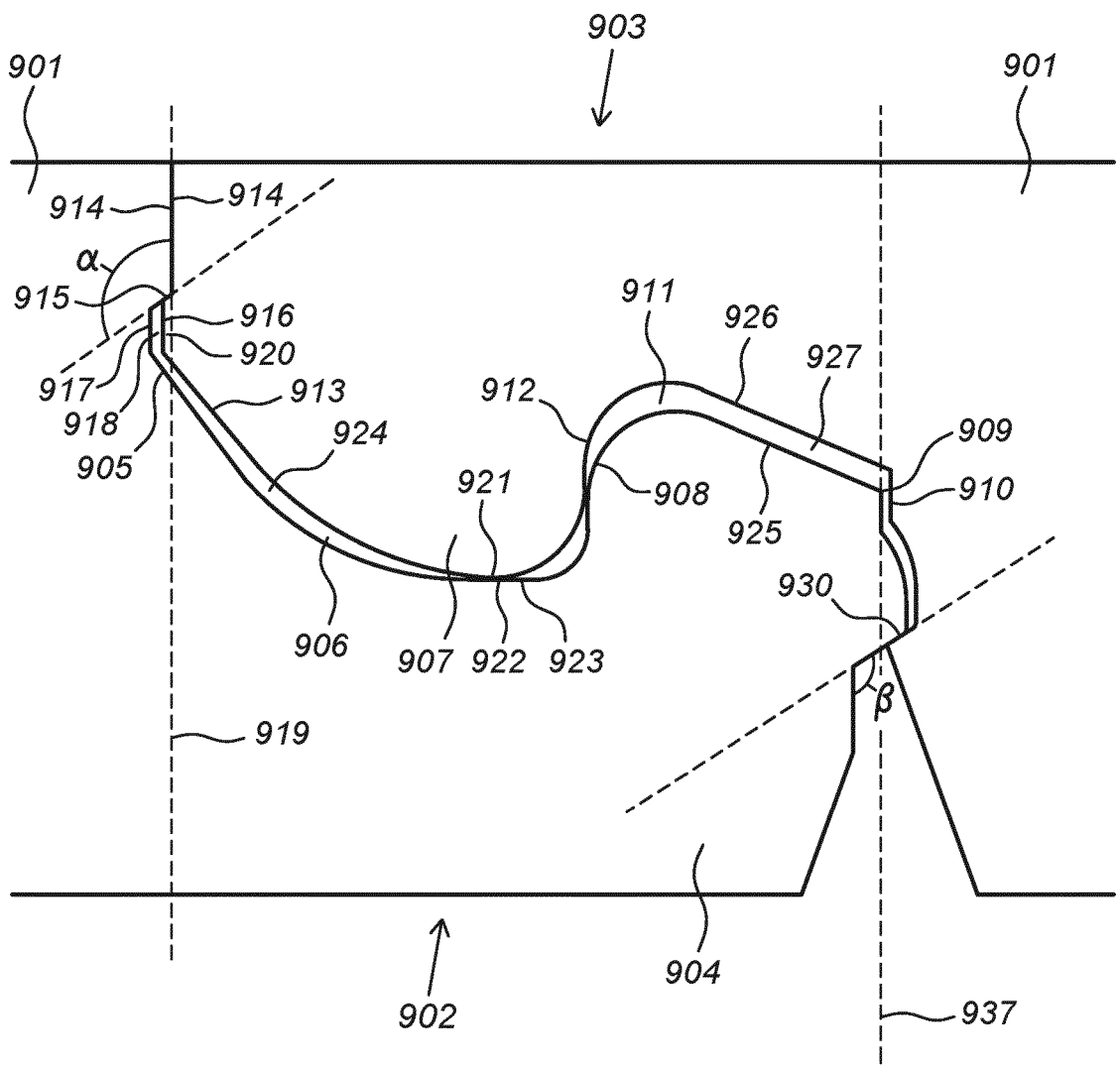

FIG. 9a shows a floor panel (901) according to the invention, comprising a first coupling part (902) and a second coupling part (903) in coupled condition. The first coupling part (902) comprises an upward tongue (904), an upward flank (905) lying at a distance from the upward tongue (904) and an upward groove (906) formed in between the upward tongue (904) and the upward flank (905), wherein the upward groove (906) adapted the downward tongue (907) of a second coupling part (903) of another panel (901). The side of the upward tongue (904) facing towards the upward flank is the inside (908) of the upward tongue (904) and the side of the upward tongue (904) facing away from the upward flank (905) is the outside (909) of the upward tongue (904).

The second coupling part (903) comprises a downward tongue (907), a downward flank (910) lying at a distance from the downward tongue (907), and a downward groove (911) formed in between the downward tongue (907) and the downward flank (910). The side of the downward tongue (907) facing towards the downward flank (910) is the inside (912) of the downward tongue (907) and the side of the downward tongue (907) facing away from the downward flank (910) is the outside (913) of the downward tongue (907).

The outside (913) of the downward tongue (907) and the upward flank (905) both comprise an upper contact surface (14) at the top of the panel (901), which upper contact surfaces (914) are in contact extend vertically. Adjoining the upper contact surfaces (914) both the downward tongue (907) and the upward flank (905) comprise an inclined contact surface (915), which inclined contact surfaces (915) are in contact, wherein the upper contact surfaces (914) on the one hand, and the inclined contact surfaces (915) of the upward flank (905) and/or the outside (913) of the downward tongue (907) on the other hand preferably mutually enclose an angle (a) of approximately 125 degrees. The upper contact surface (914) and the inclined contact surface (915) of the upward flank (905) mutually enclose a first angle of about 125 degrees, and the upper contact surface (914) and the inclined contact surface (915) of the downward tongue (907) mutually enclose a second angle of about 125 degrees.

Adjoining the inclined contact surface (915) the downward tongue (907) comprises an outer surface (916), and adjoining the inclined contact surface (915) the upward flank (905) comprises an inner surface (917), wherein the outer (916) and inner (917) surface are parallel and vertical. Between the outer surface (916) and the inner surface (917) a space (918) is present.

The upper contact surfaces (914) define an inner vertical plane (919), wherein the inclined contact surface (915) of the downward tongue (97) extends beyond the inner vertical plane (919) the inclined contact surface (915) of the upward flank (905) lies inward compared to the inner vertical plane (919). A portion (920) of the downward tongue (907) extends beyond the inner vertical plane (919), wherein said portion (920) is substantially trapezium-shaped or wedge-shaped. The inclined contact surfaces (915) are both arranged completely outside and adjoining the inner vertical plane (919). The portion (920) is elongated with a larger vertical portion compared to the horizontal portion.

The bottom (921) of the downward tongue (907) contacts the upper side (922) of the upward groove (906) at a groove contact surface (923), wherein a gap (924) is present between the first (902) and second (903) coupling parts, extending from the inclined contact surfaces (915) to the groove contact surface (923). Additionally the upper surface (925) of the upward tongue (904) and the upper surface (926) of the downward groove (911), are distanced from each other such that a gap (927) is present between the two surfaces (925, 926).

The outside (909) of the upward tongue (904) comprises a first locking element (928), in the form of an outward bulge and the downward flank (910) is provided with a second locking element (929), in the form of a recess, wherein the first (928) and at least a part of second (929) locking element are in contact, and form a locking element surface (930).

Figure 9B:
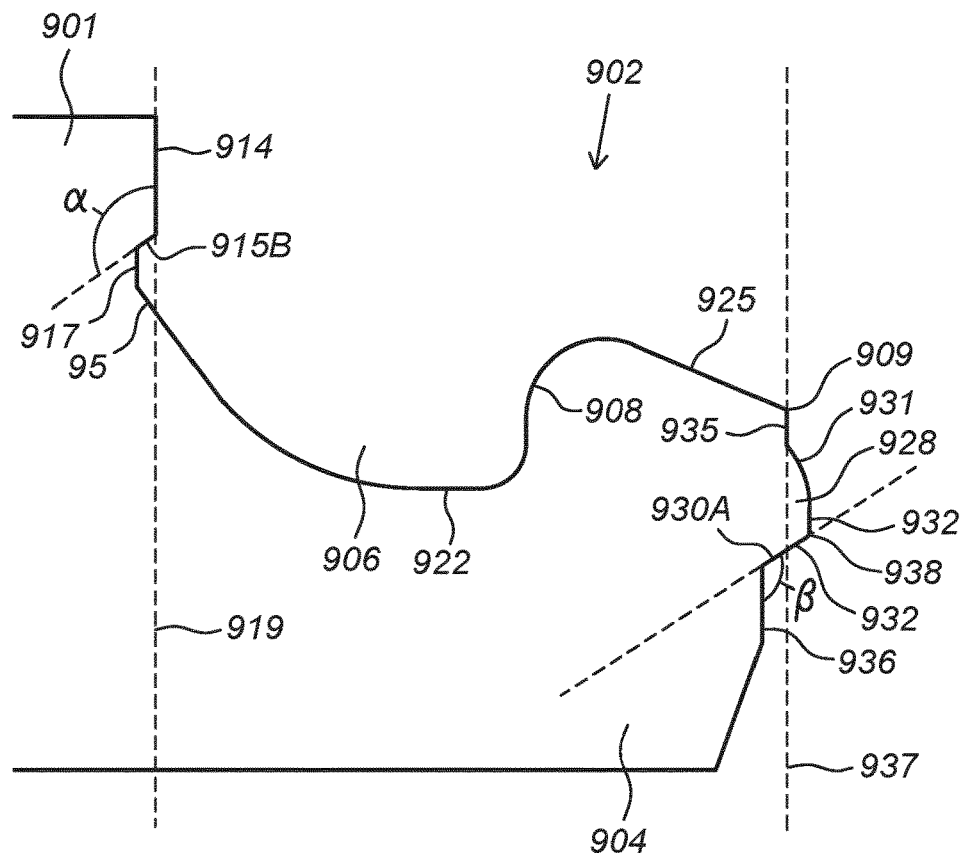
Figure 9C:
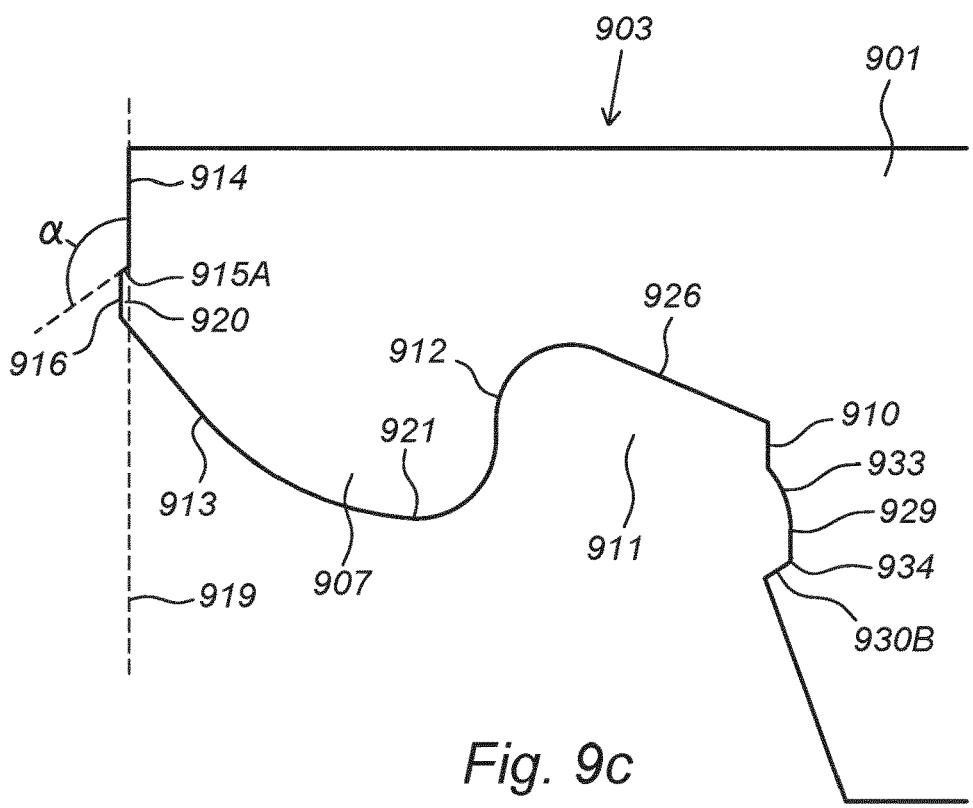

FIGS. 9b and 9c show the first and second coupling parts individually. The outside of the outward bulge (928) comprises an upper portion (931) and an adjoining lower portion (932), wherein the lower portion (932) comprises an inclined locking surface (930a) and the upper portion (931) comprises a curved, guiding surface (932). The recess (929) comprises an upper portion (933) and an adjoining lower portion (934), wherein the lower portion comprises an inclined locking surface (930B). The upper portion (931, 933) extends over a larger vertical section compared to the lower portion (932, 934).

The parts of the first (928) and second (929) locking element that are in contact are the inclined locking surfaces (930, 930A, 930B) of the locking elements (928, 929) and the upper portions (931, 933) of the first (928) and second (929) locking elements are spaced apart at least partially.

The outside (909) of the upward tongue (907) comprises an upper outside portion (935), and a lower outside portion (936), wherein the first locking element (928) is arranged between the upper (935) and lower outside portion (936).

The lower outside portion (936) is arranged closer to the inside (908) of the upward tongue (904) compared to the upper outside portion (935).

The upper outside portion (935) is substantially vertical and defines an outer vertical plane (937), wherein the first locking element (928) protrudes from the outer vertical plane (937). The lower outside portion (936) is substantially vertical and the inclined locking surface (930A) or the lower portion (932) and the lower outside portion (936) enclose an angle (β) between 100 and 175 degrees. The angle (α) enclosed by the upper contact surfaces and the inclined contact surfaces and the angle (β) enclosed by the lower outside portion (936) and the inclined locking surface (930A) or the lower portion (932) is about the same.

An outermost portion (938) of the first locking element (928) is arranged at a horizontal level which is lower compared to the upward groove (906).

Further possible and/or advantageous compositions of the core have been described above in a comprehensive manner.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A decorative panel, comprising:
   a core provided with an upper side and a lower side,
   a first panel edge comprising a first coupling profile, and
   a second panel edge comprising a second coupling profile being designed to engage interlockingly with said first coupling profile of an adjacent panel, both in horizontal direction and in vertical direction,
   wherein said core comprises at least one material layer which comprises:
   polyvinyl chloride (PVC), and
   at least one plasticizer composition which comprises:
   polyvinyl butyral (PVB) and
   one or more admixed copolymers,
   wherein the core comprises an alloy of the PVC and elastic particles dispersed in said PVC, wherein the elastic particles are bonded to the PVC by means of a covalent bond.

2. The panel according to claim 1, wherein the first and second coupling profiles are part of the material layer.

3. The panel according to claim 1, wherein the polyvinyl butyral component is recycled polyvinyl butyral, virgin polyvinyl butyral or a mixture thereof.

4. The panel according to claim 1, wherein the admixed copolymers are selected from the group consisting of:
   Ethylene vinyl alcohol Copolymer;
   A modified ethylene acrylate carbon monoxide terpolymer composition comprising ethylene vinyl acetates (EVAs), polyethylenes, metallocene polyethylenes, ionomers, ethylene propylene rubbers and polypropylenes;
   ethylene vinyl acetate copolymer;
   mixtures thereof, and/or
   one or more derivatives of the above copolymers.

5. The panel according to claim 1, wherein the admixed copolymer is an Ethylene vinyl alcohol Copolymer Resin, optionally combined with one or more other admixed copolymer(s).

6. The panel according to claim 1, wherein the core comprises 100 parts polyvinyl chloride as a main polymer and from 20 to 400 parts of the plasticizer composition.

7. The panel according to claim 1, wherein the plasticizer composition further comprises one or more additional plasticizers chosen from the group consisting of:
   An ortho-phthalate with an alkyl chain backbone having at least 7 carbon atoms, wherein the ortho-phthalate is DPHP (bis(2-propyl heptyl phthalate)), DIUP (disoundecylphtalate), DTDP (disotridecyl phthalate), Di-isodecyl phthalate (DIDP), or Di-isononyl phthalate (DINP);
   A terephthalate, wherein the terephthalate is (DOTP (Dioctyl terephthalate);
   A cyclohexanoate, wherein the cyclohexanoate is DC9CH (cyclohexanoate diester);
   A phthalate ester;
   A citrate, wherein the citrate is ATBC (acetyl tributyl citrate) tripentyl acetyl citrate (ATPC), trihexyl acetyl citrate (ATHC), triheptyl acetyl citrate (ATHC), trioctyl acetyl citrate (ATOC), or trinonyl acetyl citrate (ATNC);
   An adipates, wherein the adipates is DOA (dioctyl adipates) or Bis(2-ethyl hexyl adipate),
   A phosphate ester, wherein the phosphate ester is TPP (triphenyl phosphate);
   An azelate, wherein the azelate is DiDA (di iso decyl adipates) or dioctyl azelate or di-2-ethylhexyl azelate;
   A trimellitate, wherein the trimellitate is TOTM (Tris (2-Ethylhexyl) Trimellitate), tributyl trimellitate (TBTM), triisobutyl trimellitate (TiBTM), triethylhexyl trimellitate (TEHTM), or triisononyl trimellitate (TINTM);
   A dibenzoate, wherein the dibenzoate is ODEDB (oxydiethylene dibenzoate) or OXPDB (oxydipropyl benzoate); and
   1,2-benzenedicarboxylic acid.

8. The panel according to claim 6, wherein the main polymer and/or the plasticizer composition is a recycled material and/or is a biobased material.

9. The panel according to claim 1, wherein the core and/or a backing layer comprises at least one filler chosen from the group consisting of: a mineral, wherein the mineral is calcium carbonate; a pigment, fibres, wherein the fibres are glass fibres, coconut fibres, Kevlar fibres, nylon fibres, perlon fibres, sisal fibres, or fique fibres, and cellulose based particles, wherein the cellulose based particles are wood or hemp.

10. The panel according to claim 1, wherein the core comprises at least one fire-retardant additive.

11. The panel according to claim 1, wherein the core comprises a laminate of cores, which are either directly and/or indirectly, stacked onto each other.

12. The panel according to claim 1, wherein a top structure of the panel comprises at least one decorative layer and at least one transparent wear layer covering said decorative layer.

13. The panel according to claim 1, wherein the first coupling profile comprises:

a first upward tongue, at least one first upward flank lying at a distance from the upward tongue, a first upward groove formed in between the first upward tongue and the first upward flank wherein the first upward groove is adapted to receive at least a part of a second downward tongue of a second coupling profile of an adjacent panel, and at least one first locking element provided at a distant side of the first upward tongue facing away from the upward flank, and wherein the second coupling profile comprises:

a second downward tongue, at least one second downward flank lying at a distance from the downward tongue, a second downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element being provided at the downward flank.

14. The panel according to claim 1, wherein the panel comprises at least one third coupling profile and at least one fourth coupling profile located respectively at a third panel edge and a fourth panel edge, wherein the third coupling profile comprises:

a sideward tongue extending in a direction substantially parallel to a plane defined by the panel, at least one third downward flank lying at a distance from the sideward tongue, and a third downward groove formed between the sideward tongue and the third downward flank, wherein the third coupling profile and the fourth coupling profile are configured such that two of such panels can be coupled to each other by means of a turning movement.

15. The panel according to claim 1, wherein a fourth coupling profile comprises a fourth groove configured for accommodating at least a part of a sideward tongue of a third coupling profile of an adjacent panel, said fourth groove being defined by an upper lip and a lower lip, wherein said lower lip is provided with an upward locking element, wherein, in coupled condition: at least a part of the sideward tongue of a first panel is inserted into the fourth groove of an adjacent, second panel, and wherein at least a part of the upward locking element of said second panel is inserted into a third downward groove of said first panel.

16. The panel according to claim 1, wherein a main polymer is at least partially foamed by the plasticizer composition.

17. The panel according to claim 1, wherein a main polymer is at least partially foamed by polyvinyl butyral (PVB).

18. The panel according to claim 1, wherein at least a fraction of the polyvinyl butyral (PVB) of the plasticizer is formed by recycled polyvinyl butyral obtained from windshields.

19. The panel according to claim 1, wherein at least a fraction of the polyvinyl butyral (PVB) used in the plasticizer composition is plasticized polyvinyl butyral.

20. The panel according to claim 1, wherein at least one main polymer is at least partially formed by recycled foamed polyurethane obtained from footwear.

21. A decorative covering, comprising a plurality of mutually coupled decorative panels according to claim 1.

* * * * *

UNITED STATES PATENT AND TRADEMARK OFFICE
CERTIFICATE OF CORRECTION

| | | |
|---|---|---|
| PATENT NO. | : 12,326,002 B2 | Page 1 of 1 |
| APPLICATION NO. | : 18/007522 | |
| DATED | : June 10, 2025 | |
| INVENTOR(S) | : Eddy Alberic Boucké | |

It is certified that error appears in the above-identified patent and that said Letters Patent is hereby corrected as shown below:

On the Title Page

Column 1, item (73) Assignee, Line 1, delete "14F" and insert -- i4F --

In the Specification

Column 1, Lines 11-12, delete "U.S. Pat. No. 2,026,896" and insert -- 2026896 --

In the Claims

Column 38, Lines 19-20, Claim 7, delete "(disoundecylphtalate)," and insert -- (diisodecyl phthalate), --

Column 38, Line 20, Claim 7, delete "(disotridecyl" and insert -- (diisotridecyl --

Column 38, Line 23, Claim 7, delete "(DOTP" and insert -- DOTP --

Signed and Sealed this
Nineteenth Day of August, 2025

Coke Morgan Stewart
*Acting Director of the United States Patent and Trademark Office*